United States Patent
Somayazulu et al.

(10) Patent No.: US 12,369,106 B2
(45) Date of Patent: Jul. 22, 2025

(54) OCCUPANCY GRID MAP COMPUTATION, V2X COMPLEMENTARY SENSING, AND COORDINATION OF COOPERATIVE PERCEPTION DATA TRANSMISSION IN WIRELESS NETWORKS

(71) Applicant: Intel Corporation, Santa Clara, CA (US)

(72) Inventors: Vallabhajosyula S. Somayazulu, Portland, OR (US); Rath Vannithamby, Portland, OR (US); Kathiravetpillai Sivanesan, Portland, OR (US); Markus Dominik Mueck, Unterhaching (DE); Leonardo Gomes Baltar, Munich (DE); Marcio Rogerio Juliato, Portland, OR (US); Liuyang Lily Yang, Portland, OR (US); Manoj R. Sastry, Portland, OR (US); Shabbir Ahmed, Beaverton, OR (US); Christopher Gutierrez, Hillsboro, OR (US); Vuk Lesi, Cornelius, OR (US); Qian Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/483,528

(22) Filed: Sep. 23, 2021

(65) Prior Publication Data
US 2022/0240168 A1  Jul. 28, 2022

(51) Int. Cl.
*H04W 48/16* (2009.01)
*H04W 4/40* (2018.01)
(Continued)

(52) U.S. Cl.
CPC ........... *H04W 48/16* (2013.01); *H04W 4/40* (2018.02); *H04W 8/24* (2013.01); *H04W 48/14* (2013.01); *H04W 72/51* (2023.01)

(58) Field of Classification Search
CPC ......... H04W 8/24; H04W 72/51; H04W 4/46; H04L 67/1051
See application file for complete search history.

(56) References Cited

U.S. PATENT DOCUMENTS 8,296,413 B2 * 10/2012 Bornhoevd ........... H04L 67/125
709/224
9,672,734 B1 * 6/2017 Ratnasingam ... G08G 1/096741
(Continued)

FOREIGN PATENT DOCUMENTS

| EP | 4156729 | 1/2025 |
|---|---|---|
| WO | 2021040352 | 3/2021 |
| WO | 2021087942 | 5/2021 |

OTHER PUBLICATIONS

"Intelligent Transport System (ITS); Vehicular Communications; Basic Set of Applications; Collective Perception Service; Release 2)", Jun. 2023, ETSI TS 103 324, v2.1.1, https://www.etsi.org/deliver/etsi_ts/103300_103399/103324/02.01.01_60/ts_103324v020101p.pdf.*

(Continued)

*Primary Examiner* — Douglas B Blair
(74) *Attorney, Agent, or Firm* — Schwegman Lundberg & Woessner, P.A.

(57) ABSTRACT

A computing node to implement a management entity in a CP-based network. The node including processing circuitry configured to encode an inquiry message requesting information on CPS capabilities. Response messages are received from a set of sensing nodes of a plurality of sensing nodes in response to the inquiry message. The response messages include the information on the CPS capabilities of the set of (Continued)

sensing nodes. A notification message indicating selecting of a sensing node as a sensing coordinator is encoded for transmission. Sensed data received in a broadcast message from the sensing coordinator is decoded. The sensed data including data associated with one or more non-V2X capable sensing nodes.

22 Claims, 19 Drawing Sheets

(51) Int. Cl.
*H04W 8/24* (2009.01)
*H04W 48/14* (2009.01)
*H04W 72/51* (2023.01)

(56) References Cited

U.S. PATENT DOCUMENTS

| | | | | |
|---|---|---|---|---|
| 10,967,833 | B1 | 4/2021 | Nagao et al. | |
| 12,236,779 | B2* | 2/2025 | Jha | G08G 1/0112 |
| 12,238,620 | B2* | 2/2025 | Back | H04W 92/10 |
| 2011/0022442 | A1* | 1/2011 | Wellman | G05D 1/0291 |
| | | | | 705/330 |
| 2012/0158820 | A1* | 6/2012 | Bai | G07C 5/008 |
| | | | | 709/202 |
| 2015/0049632 | A1* | 2/2015 | Padmanabhan | H04L 67/34 |
| | | | | 370/254 |
| 2020/0042013 | A1 | 2/2020 | Kelkar et al. | |
| 2020/0249312 | A1* | 8/2020 | Lewandowski | H04Q 9/04 |
| 2021/0014656 | A1* | 1/2021 | Mueck | H04W 4/40 |
| 2021/0035035 | A1* | 2/2021 | Wellman | G06Q 10/0637 |
| 2021/0105713 | A1* | 4/2021 | Young | H04W 48/18 |
| 2022/0110018 | A1* | 4/2022 | Jha | H04W 74/0816 |
| 2022/0343241 | A1* | 10/2022 | Jha | G08G 1/166 |
| 2022/0383750 | A1* | 12/2022 | Sharma Banjade | G08G 1/005 |
| 2022/0400403 | A1* | 12/2022 | Vassilovski | H04W 4/38 |

OTHER PUBLICATIONS

"European Application Serial No. 22192002.8, Response filed Sep. 5, 2023 to Extended European Search Report mailed Feb. 10, 2023", 33 pgs.
"European Application Serial No. 22192002.8, Extended European Search Report mailed Feb. 10, 2023", 6 pgs.

* cited by examiner

OCCUPANCY GRID MAP COMPUTATION, V2X COMPLEMENTARY SENSING, AND COORDINATION OF COOPERATIVE PERCEPTION DATA TRANSMISSION IN WIRELESS NETWORKS

TECHNICAL FIELD

Embodiments described herein generally relate to the processing of data in sensor-based wireless networks. Some embodiments relate to low latency and high accuracy occupancy grid map (OGM) computation using distributed processing across multiple sensor devices and edge servers. Other embodiments relate to the coordination of transmission of cooperative perception data to reduce redundancy. Yet additional embodiments relate to increasing resiliency of safety models through vehicle-to-everything (V2X) complementary sensing.

BACKGROUND

With the proliferation of connected road infrastructure in smart city roads, smart intersections, and smart factories, telecommunications providers and/or Infrastructure Owner Operators (IOOs) continue to deploy network/road infrastructures that expand to Road-Side-Units (RSUs) and other sensor devices at scale. However, existing service request discovery, quality of service (QoS) configuration techniques, as well as gathering and processing of data in sensor-based wireless networks may be inadequate to enable scalable deployment and commercial wide-scale services on roads with the help of the edge infrastructure.

BRIEF DESCRIPTION OF THE DRAWINGS

Some embodiments are illustrated by way of example, and not limitation, in the figures of the accompanying drawings in which.

DETAILED DESCRIPTION

Figure 1:
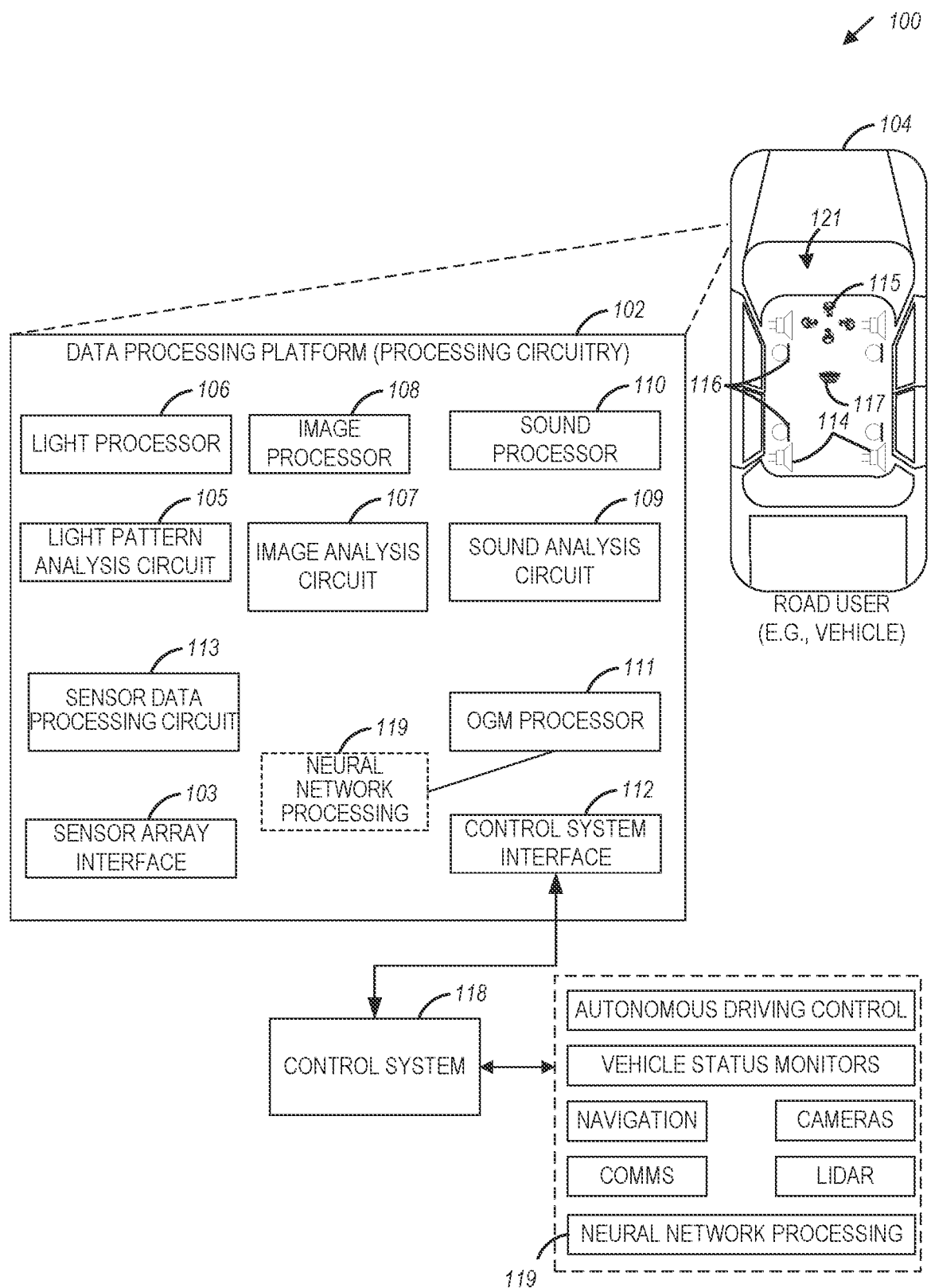
FIG. 1 is a schematic drawing illustrating a system using a data processing platform to process sensor data in connection with disclosed functionalities, according to an example embodiment.

In the following description, for purposes of explanation, numerous specific details are set forth in order to provide a thorough understanding of some example embodiments. It will be evident, however, to one skilled in the art that the present disclosure may be practiced without these specific details.

With the advent of Internet-of-Things (IoT) and Fifth Generation (5G) and 5G+ technologies, diverse classes and flows of data arriving at the edge from a variety of devices in smart cities, factories, commercial infrastructure, homes, and other verticals necessitate the processing of such large-scale data for analytics, visualization, prediction, and other services. Such analytics-based outcomes may then be fed back to the sources of the data in the real world, in real-time to result in the edge-to-real-world feedback control loop. For instance, connected cars or autonomous cars send significant amounts of compute-intensive data (e.g., collective perception data from sensors, speeds, locations, neural network processed data, occupancy grid map data, etc.) to be processed at the edge for, say, analytics in a smart city environment for potential hazards, source-to-destination best route prediction, and/or optimization and so forth. To this end, several challenges exist for computing infrastructures deployed within the smart city IoT scope, which can be addressed using the disclosed techniques.

The European Telecommunications Standards Institute (ETSI) Intelligent Transportation System (ITS) has been developing a standard for the Collective Perception Service (CPS), which may be used in connection with several advanced vehicle-to-everything (V2X) use cases, including some use cases related to the 5G Automotive Association (5GAA) proposed cellular V2X (C-V2X) roadmap for mass deployment.

In current collective perception (CP) solutions, vehicles, other traffic participants, and roadside infrastructure collect sensor data on neighboring road users or objects and distribute the corresponding data to all road users in a V2X coverage area. This approach may be inefficient because (a) there is a considerable level of redundancy since a given road user or object might be sensed by a large number of other road users and infrastructure nodes, and each of them is then distributing quasi-identical information about the given road user or object, and (b) some C-V2X equipped road users and infrastructure nodes periodically distribute information which does not need to be acquired through sensing by all other road users. All this redundancy significantly increases the spectrum needs for CP services. In other words, if all vehicles are sensing all other vehicles and each vehicle broadcasts the sensing information, significant levels of redundancy are occurring.

As used herein, the terms "collective perception" and "cooperative perception" are synonymous. As used herein, the term "road user" may include a mobile user of a road infrastructure or a stationary user of the road infrastructure. As used herein, the term "mobile user" includes a computing device or node implemented within a vehicle, motorcycle, bike, or another object that is moving within the road infrastructure. A "mobile user" may also include a pedestrian carrying such a computing device or node while moving within the road infrastructure. As used herein, the term "stationary user" includes implemented within a stationary structure associated with the road infrastructure, such as a roadside unit (RSU), a base station, or another stationary structure.

Techniques disclosed herein may be used in connection with a collective/cooperative sensing approach, which compared to existing solutions, reduces the redundant information being shared among road users and infrastructure. In addition, the absolute amount of data being shared or transmitted is reduced through intelligent compression c0-optimized with the perception. The disclosed techniques (e.g., as discussed in connection with FIGS. 2-10 and 18) are based on coordination among the road users (e.g., mobile and/or stationary computing nodes) with emphasis on the support by the road infrastructure.

Additional disclosed techniques (e.g., as discussed in connection with FIGS. 11-15) are associated with using sensor data (also referred to as sensed data) and V2X communications with vehicles of a vehicle flee to establish keep-out zones and build a safe drivable region in a road infrastructure environment. This enables an ego vehicle to make informed and safe decisions even without full perception of the surrounding environment. In this regard, as the ego vehicle drives, it keeps building a blueprint of alternative/backup trajectories that may be used in emergencies. Such techniques enable the proactive mapping of recovery paths that the ego vehicle can use to quickly react in the event of contingencies.

Other disclosed techniques (e.g., as discussed in connection with FIG. 16 and FIG. 17) are associated with selecting a set of cameras to associate with each RSU (or edge node), distributing analytics compute (e.g., to process sensor data) between intelligent cameras and the RSU/Edge node, and fusing the information from multiple cameras/RSUs to form a unified occupancy map in a reliable, low latency manner. Another attribute is the compression to intelligently reduce the amount of data transferred between the multiple road users/agents in the network.

The disclosed techniques used sensor data generated by different types of sensors. In some aspects, road users (e.g., as illustrated in FIG. 1) may include various forward, sideward, and rearward facing sensor arrays. The sensors may include radar, LiDAR (light imaging detection and ranging), light sensors, cameras for image detection, sound sensors (including microphones or other sound sensors used for vehicle detection such as emergency vehicle detection), ultrasound, infrared, temperature sensors, location sensors, movement sensors, speed sensors, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Any of the communication links illustrated in FIGS. 1-19 or described herein may operate according to any one or more of the following radio communication technologies and/or standards including but not limited to: a Global System for Mobile Communications (GSM) radio communication technology, a General Packet Radio Service (CPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LIE), 3GPP Long Term Evolution Advanced (LIE Advanced). Code division multiple access 2000 (CDMA2000), Cellular Digital Packet Data (CDPD). Mobitex, Third Generation (3G), Circuit Switched Data (CSD). High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA). High-Speed Uplink Packet Access (HSUPA), High Speed Packet Access Plus (FISPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd. Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LIE-Advanced Pro, LIE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LIE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopthelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network. or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-GSA (i.e., Operation of ITS-GS in European ITS frequency bands dedicated to ITS for safety related applications in the frequency range of 5,875 GHz to 5,905 GHz), ITS-GSB (i.e., Operation in European ITS frequency bands dedicated to ITS non-safety applications in the frequency range 5,855 GHz to 5,875 GHz), ITS-GSC (i.e., Operation of ITS applications in the frequency range 5,470 GHz to 5,725 GHz), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license-exempt spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS)/Citizen Broadband Radio System (CBRS) in 3.55-3.7 GHz and further frequencies). Applicable spectrum bands include IMT (International Mobile Telecommunications) spectrum as well as other types of spectrum/bands, such as bands with national allocation (including 450-470 MHz. 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. A next generation Wi-Fi system is expected to include the 6 GHz spectrum as an operating band but it is noted that, as of December 2017, a system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 4.2-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz). WiGig Band 2 (59.40-61.56 GHz) and WiGig Band 3 (61.56-63.72 (kHz) and WiGig Band 4 (63.72-65.88 GHz), 57-64/66 GHz (note: this band has a near-global designation for Multi-Gigabit Wireless Systems (MGWS)/WiGig. In the US, FCC part 15 allocates a total of 14 GHz spectrum, while EU (ETSI EN 302 567 and ETSI EN 301 217-2 for fixed P2P) allocates a total of 9 GHz spectrum), the 70.2 GHz-71 (kHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on prioritized access to the spectrum e.g, with the highest priority to tier-1 users, followed by tier-2, then tier-3, etc. users, etc.

Aspects described herein can also be applied to different Single Carrier (SC) or Orthogonal Frequency Division Multiplexing (OFDM) flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in the present disclosure may be configured for use at the network side, such as Access Points, eNodeBs, New Radio (NR), or next generation Node Bs (gNodeB or gNB note that this term is typically used in the context of 3GPP fifth-generation (5G) communication systems), etc. Still, a User Equipment (UE) may also perform the disclosed techniques as well and act as an Access Point, eNodeB, gNodeB, etc. (i.e., some or all features defined for network equipment may be implemented by a UE).

FIG. 1 is a schem atic drawing illustrating a system 100 using a data processing platform to process sensor data in connection with disclosed functionalities, according to an embodiment. FIG. 1 includes a data processing platform 102 incorporated into road user (e.g., vehicle) 104. The data processing platform 102 includes a light processor 106, a light pattern analysis circuit 105, an image processor 108, an image analysis circuit 107, a sound processor 110, a sound analysis circuit 109, sensor data processing circuit 113, occupancy grid map (OGM) processing circuit 111, a sensor array interface 103, and a control system interface 112.

Vehicle 104, which may also be referred to as an "ego vehicle" or "host vehicle", may be any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. Vehicle 104 may operate at some times in a manual mode where a driver operates the vehicle 104 conventionally using pedals, a steering wheel, or other controls. At other times, vehicle 104 may operate in a fully autonomous mode, where vehicle 104 operates without user intervention. In addition, vehicle 104 may operate in a semi-autonomous mode, where vehicle 104 controls many of the aspects of driving (e.g., via control system 118), but the driver may intervene or influence the operation using conventional (e.g., steering wheel) and non-conventional inputs (e.g., voice control).

Vehicle 104 may include one or more speakers 114 that are capable of projecting sound internally as well as externally to vehicle 104. Vehicle 104 may further include an image capture arrangement 115 (e.g., one or more cameras) and at least one light sensor 117. The speakers 114, the image capture arrangement 115, and the light sensor 117 may be integrated into cavities in the body of the vehicle 104 with covers (e.g., grilles) that are adapted to protect the speaker driver (and other speaker components) and the camera lens from foreign objects, while still allowing sound, images, and light to pass clearly. The grilles may be constructed of plastic, carbon fiber, or other rigid or semi-rigid material that provides structure or weatherproofing to the vehicle's body. The speakers 114, the image capture arrangement 115, and the light sensor 117 may be incorporated into any portion of vehicle 104. In an embodiment, the speakers 114, the image capture arrangement 115, and the light sensor 117 are installed in the roofline of the vehicle 104, to provide better sound projection as well as image and light reception when vehicle 104 is amongst other vehicles or other low objects (e.g., while in traffic). The speakers 114, the image capture arrangement 115, and the light sensor 117 may be provided signals through the sensor array interface 103 from the sound processor 110, the image processor 108, and the light processor 106. The sound processor 110 may drive speakers 114 in a coordinated manner to provide directional audio output.

Vehicle 104 may also include a microphone arrangement 116 (e.g., one or more microphones) that are capable of detecting environmental sounds around vehicle 104. The microphone arrangement 116 may be installed in any portion of vehicle 104. In an embodiment, the microphone arrangement 116 is installed in the roofline of vehicle 104. Such placement may provide improved detection capabilities while also reducing ambient background noise (e.g., road and tire noise, exhaust noise, engine noise, etc.). The microphone arrangement 116 may be positioned to have a variable vertical height. Using vertical differentiation allows the microphone arrangement 116 to distinguish sound sources that are above or below the horizontal plane. Variation in the placement of the microphone arrangement 116 may be used to further localize sound sources in three-dimensional space. The microphone arrangement 116 may be controlled by the sound processor 108 in various ways. For instance, the microphone arrangement 116 may be toggled on and off depending on whether the speakers 114 are active and emitting sound, to reduce or eliminate audio feedback. The microphone arrangement 116 may be togged individually, in groups, or all together.

The sensor array interface 103 may be used to provide input or output signals to the data processing platform 102 from one or more sensors of a sensor array 121 installed on vehicle 104. Examples of sensors of the sensor array 121 include, but are not limited to the microphone arrangement 116; forward, side, or rearward facing cameras such as the image capture arrangement 115; radar; LiDAR; ultrasonic distance measurement sensors; the light sensor 117; speed sensors; GPS/location sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing cameras may have a relatively wide field of view, even up to 180-degrees. Similarly, a rear-facing camera that is directed at an angle (perhaps 60-degrees off-center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array 121 may include infrared or visible light cameras, able to focus at long-range or short-range with narrow or large fields of view. In this regard, the cameras may include a zoom lens, image stabilization, shutter speed, and may be able to automatically adjust aperture or other parameters based on vehicle detection.

The sensor array 121 of vehicle 104 may also include various other sensors, such as driver identification sensors (e.g., a seat sensor, an eye-tracking, and identification sensor, a fingerprint scanner, a voice recognition module, or the like), occupant sensors, or various environmental sensors to detect wind velocity, outdoor temperature, barometer pressure, rain/moisture, or the like.

Sensor data (e.g., as generated/detected by the sensor array 121) may be used in a multi-modal fashion as discussed herein to determine the vehicle's operating context, environmental information, road conditions, vehicle navigation, and other routing data, travel conditions including the presence of other vehicles on the road (e.g., presence of emergency vehicles), generating CP data, OGM data, or the like. In some embodiments, the sensor data processing circuit 113 may be used to generate or process CP data (e.g., as discussed in connection with FIGS. 2-10) or navigation-related data such as keep-out zone data and drivable area data (e.g., as discussed in connection with FIGS. 11-15). In some embodiments, the OGM processing circuit 111 may be used to generate OGM data using a neural network processing subsystem 119 (e.g., as discussed in connection with FIGS. 16-17).

The sensor array interface 103 may communicate with another interface, such as an onboard navigation system, of vehicle 104 to provide or obtain sensor data via the sensor array 121. Components of the data processing platform 102 may communicate with components internal to the data processing platform 102 or components that are external to the platform 102 using a network, which may include local-area networks (LAN), wide-area networks (WAN), wireless networks (e.g., 802.11 or cellular network), ad hoc networks, personal area networks (e.g., Bluetooth), vehicle-based networks (e.g., Controller Area Network (CAN) BUS), or other combinations or permutations of network protocols and network types using one or more of the communication link types listed herein above. The network may include a single local area network (LAN) or wide-area network (WAN), or combinations of LANs or WANs, such as the Internet. The various devices coupled to the network may be coupled to the network via one or more wired or wireless connections.

The data processing platform 102 may communicate with a control system 118 (e.g., a vehicle control system). The vehicle control system 118 may be a component of a larger architecture that controls various aspects of the vehicle's operation. The vehicle control system 118 may have interfaces to autonomous driving control systems (e.g., steering, braking, acceleration, etc.), comfort systems (e.g., heat, air conditioning, seat positioning, etc.), navigation interfaces (e.g., maps and routing systems, positioning systems, etc.), collision avoidance systems, communication systems (e.g., interfaces for vehicle-to-infrastructure, or V2I, and vehicle-to-vehicle, or V2V, communication as well as other types of communications), security systems, vehicle status monitors (e.g., tire pressure monitor, oil level sensor, speedometer, etc.), and the like. Using the data processing platform 102, the control system 118 may control one or more subsystems such as the neural network processing subsystem 119 which is used for inferencing using a neural network (e.g., a convolutional neural network or another type of neural network) trained to perform vehicle recognition functionalities or other sensor data processing functionalities discussed herein (e.g., as discussed in connection with FIGS. 16-17). In some aspects, the neural network processing subsystem 119 may be part of the CCM processing circuit 111.

Additionally, the data processing platform 102 may be used in a sensor fusion mechanism with other sensors (e.g., cameras, LiDAR, GPS, light sensors, microphones, etc.), where audio data, image data, light pattern data, and/or other types of sensor data provided by the sensor array 121 are used to augment, corroborate or otherwise assist in vehicle recognition, object type detection, object identification, object position, trajectory determinations, as well as any other sensor data processing functionalities associated with the disclosed techniques.

Sensor data, such as audio data (e.g., sounds) detected by microphone arrangement 116 installed on or around vehicle 104, are provided to the sound processor 110 for initial processing. For instance, the sound processor 110 may implement a low-pass filter, a high-pass filter, an amplifier, an analog-to-digital converter, or other audio circuitry in the sound processor 110. The sound processor 108 may also perform feature extraction of the input audio data. Features may then be provided to the sound analysis circuit 109 for identification.

The sound analysis circuit 109 may be constructed using one of several types of machine learning, such as artificial neural networks (ANN), convolutional neural networks (CNN), support vector machines (SVM), Gaussian mixture model (GMM), deep learning, or the like. Using the features provided by the sound processor 110, the sound analysis circuit 109 may analyze the audio data and identify a sound event. The sound analysis circuit 109 returns an indication of the sound event, an indication of a detected vehicle, or a possible classification of the vehicle (e.g., an emergency vehicle type such as a police vehicle, an ambulance, a fire truck, etc.) to the sound processor 110 and the sensor data processing circuit 113 for further processing (e.g., to generate CP data, navigation/routing data, OGM data, or to perform vehicle type recognition). While the sound analysis circuit 109 is in vehicle 104 in the example shown in FIG. 1, it is understood that some or all of the data processing (by the sound processor 110 or any other circuit of the data processing platform 102) may be offboarded, such as at a network-accessible server (e.g., cloud service). For example, feature extraction and vehicle recognition may be performed locally at vehicle 104 to reduce the amount of data to be sent to a cloud service.

Additional sensor data may also be used by the data processing platform 102 in connection with performing the disclosed techniques. For example, additional sensor data, such as image data detected by the image capture arrangement 115 and light signals detected by the light sensor 117 are provided to the image processor 108 and the light processor 106 respectively for processing. In some aspects, the image processor 108 and the light processor 106 may also perform feature extraction of the input image data and light signals. Features may then be provided to the image analysis circuit 107 and the light pattern analysis circuit 105 for identification.

The image analysis circuit 107 and the light pattern analysis circuit 105 may be constructed using one of several types of machine learning, such as ANN, CNN, SVM, GMM, deep learning, or the like. Using the features provided by the image processor 108 and the light processor 106, the image analysis circuit 107 and the light pattern analysis circuit 105 analyze the image data and light signals to identify an image event and a light event respectively. In some aspects, the image event is detecting a visual representation of a vehicle (or another road user) within at least one image frame associated with the image data. The light event can include a specific light pattern emitted by a vehicle (or another road user), which light pattern may be indicative of a type of vehicle (or road user), a vehicle condition, a road condition in the vicinity of the light-emitting vehicle, etc. The image analysis circuit 107 and the light pattern analysis circuit 105 return an indication of the image event and an indication of the light pattern respectively to the image processor 108, the light processor 106, and the sensor data processing circuit 113 for further processing in connection with disclosed functionalities. While the image analysis circuit 107 and the light pattern analysis circuit 105 are in vehicle 104 in the example shown in FIG. 1, it is understood that some or all of the classification processing or sensor data processing may be offboarded, such as at a network-accessible server (e.g., cloud service).

In some aspects, data generated by the sensor data processing circuit 113 may be communicated (e.g., via a wireless communication link) through the control system interface 112 and communication circuitry of the control system 118. The control system interface 112 may be directly or indirectly connected to an onboard vehicle infotainment system or other vehicle systems illustrated in FIG. 1. In response to the message, the vehicle control system 118 or another component in vehicle 104 may generate a notification to be presented to an occupant of the vehicle 104 on a display, with an audio cue, using haptic feedback in the seat or steering wheel, or the like. The notification may also initiate other actions to cause the vehicle operator to provide attention to the detected situation, such as muting music playback, interrupting a phone call, or autonomously navigating vehicle 104 toward the side of the road and slowing vehicle 104 to a stop (e.g., in emergency road conditions such as road closures or presence of emergency vehicles). Other autonomous vehicle actions may be initiated depending on the type, severity, location, or other aspects of an event detected with the data processing platform 102.

Figure 10:
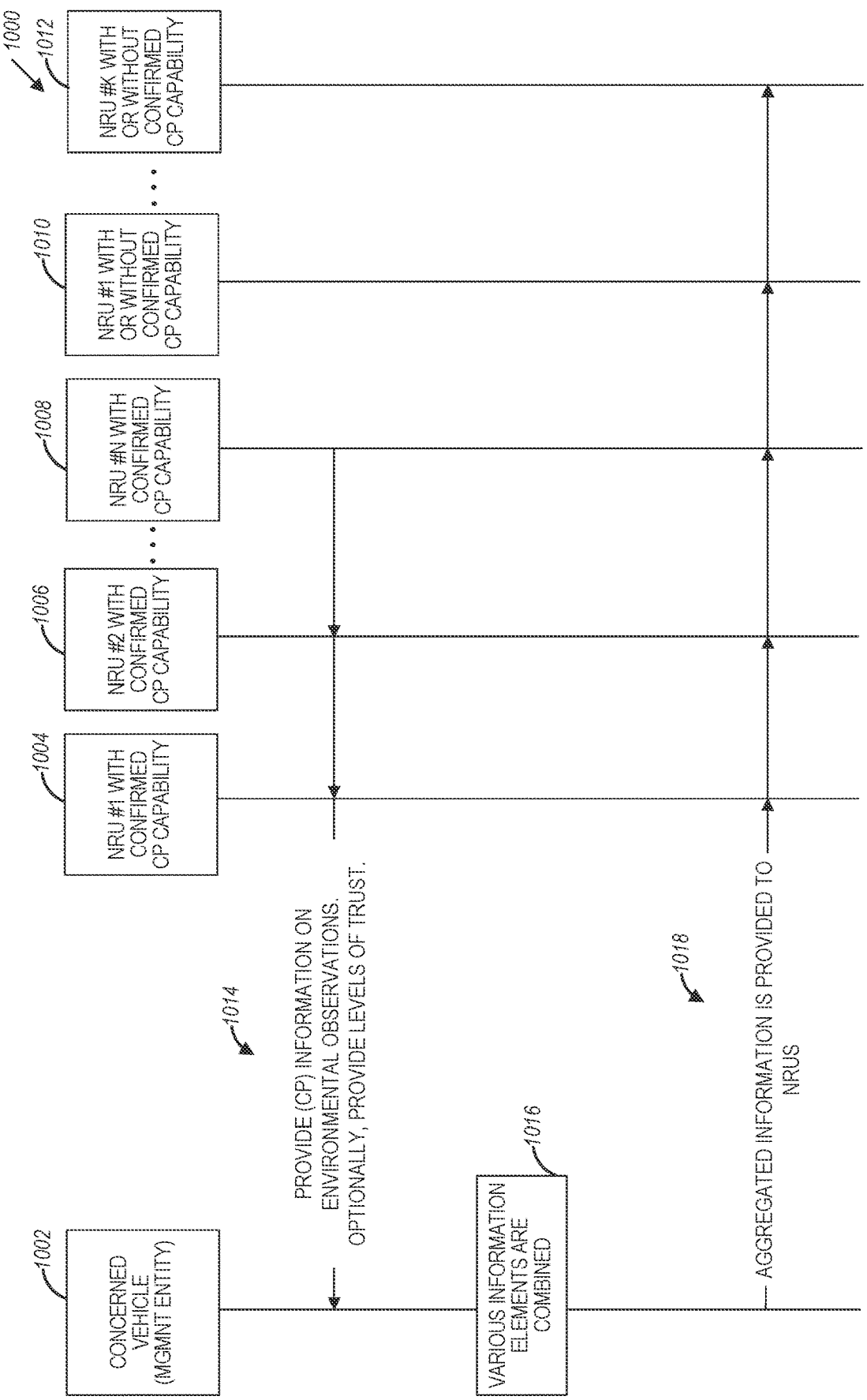
FIG. 10 illustrates a swimlane diagram of aggregation of information and re-distribution of information among computing devices, according to an example embodiment.

Various functionalities of the sensor data processing circuit 113 associated with CP data are discussed in connection with FIG. 2 FIG. 10. Various functionalities of the sensor data processing circuit 113 associated with navigation-related data such as keep-out zone data and drivable area data are discussed in connection with FIGS. 11-15. Various functionalities of the OGM processing circuit 111 associated with generating OGM data using the neural network processing subsystem 119 are discussed in connection with FIGS. 16-17.

Figure 2:
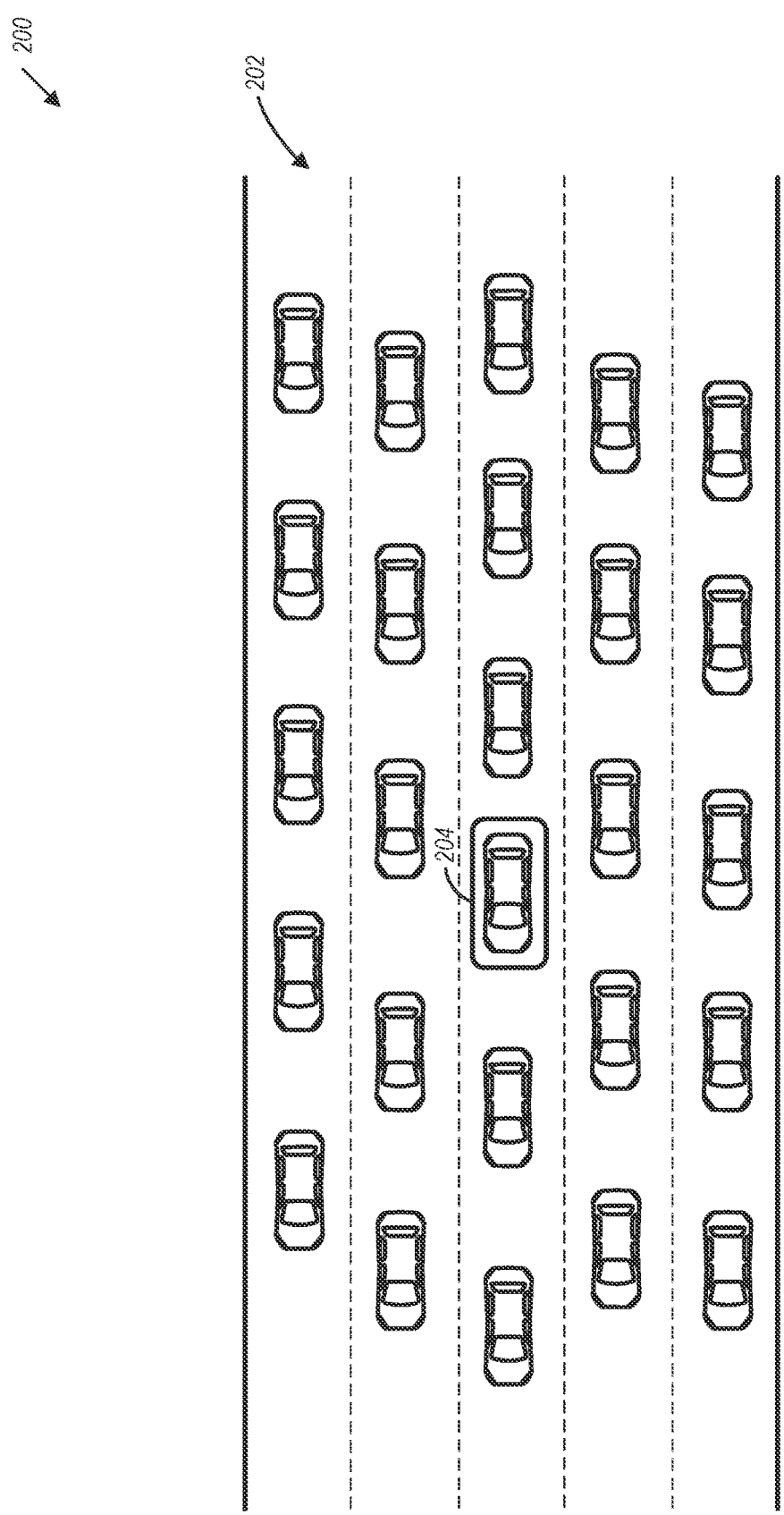
FIG. 2 illustrates a plurality of road users configured as a plurality of sensing nodes in a collective perception (CP)-based network, according to an example embodiment.

FIG. 2 illustrates a diagram of a plurality of road users 200 configured as a plurality of sensing nodes in a collective perception (CP)-based network, according to an example embodiment. Referring to FIG. 2, the plurality of road users 200 may include vehicles moving within a road infrastructure 202 (e.g., a road).

Cooperative Perception (CP) is a field of interest to the automotive industry and is being considered in standardization in both ETSI and the Society of Automotive Engineers (SAE). In connection with CP, a vehicle (e.g., vehicle 204) (or another road user or infrastructure) moving within a road infrastructure 202 senses data (also referred to as CP information or CP data) about other road users and makes this information available (e.g., via wireless broadcast or multicast transmissions such as C-V2X or other types of transmissions) to all vehicles in the coverage area. In current CP-related techniques, any given road user or infrastructure senses every other road user, which leads to a large processing overhead and redundancy in communication. Additionally, a specific manufacturer might typically trust only the data shared via V2X by other road users or infrastructure deploying its products (e.g., specific brand, model, or type of sensors).

In previous solutions addressinu redundancy, either there is no redundancy mitigation method included in the service specification or as in the case of the current ETSI CPS specification, it does not consider the possibility of coordination based on Roadside Units (RSUs), peer-to-peer (P2P) communications, or other types of C-V2X based broadcast or multicast communications used in the disclosed techniques. The solutions under discussion in ETSI are currently based on purely passive behavior of the road users and infrastructure, where they analyze the environment based mainly on basic messages, such as the Cooperative Awareness Message (CAM) to consider whether another road user or infrastructure is sensing the same objects or road users. In this regard, in current solutions, road users detect redundant information from sensor data currently being shared before sharing the same data again.

ETSI ITS communications may be configured with a Collective Perception Service (CPS) based on CP information, and the disclosed techniques may be used for the reduction of the redundant information shared by multiple vehicles. Based on the disclosed techniques, road users and infrastructure nodes assume that there will be redundant sensor information based on the contextual information and other V2X messages, such as CAMs and basic safety messages (BSMs). In the disclosed techniques, coordination between road users and infrastructure may be used to mitigate the transmission of redundant information. A key element in the disclosed techniques is the selection of a sensing coordinator for processing sensor data associated with overlapping field-of-view (FoV) by multiple sensors. A general overview of the disclosed techniques and an example method performed by a computing node to implement a management entity in a CP-based network is provided in connection with FIG. 3.

Figure 3:
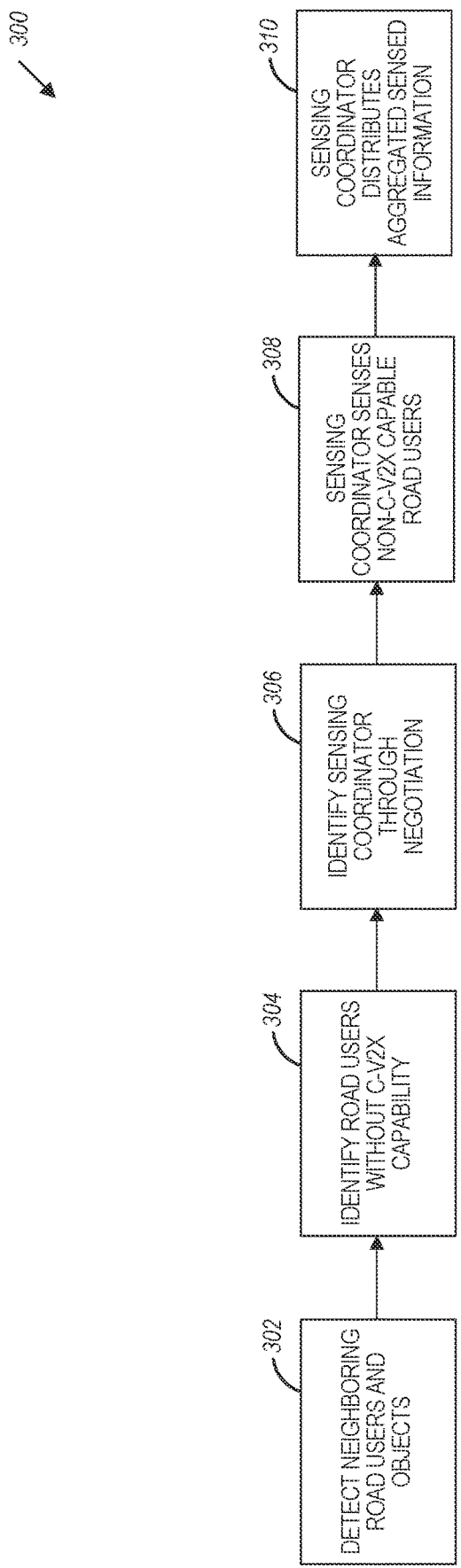
FIG. 3 illustrates a flow diagram of a method performed by a computing node configured to implement a management entity in the CP-based network of FIG. 2, according to an example embodiment.

FIG. 3 illustrates a flow diagram of a method 300 performed by a computing node configured to implement a management entity in the CP-based network of FIG. 2, according to an example embodiment. At operation 302, the management entity (e.g., vehicle 204 in FIG. 2) detects neighboring road users and objects. At operation 304, the management entity identities road users without C-V2X communication capabilities. At operation 306, the management entity identifies a sensing coordinator (also referred to herein as a coordinator or a CP coordinator). At operation 308, the sensing coordinator senses non-C-V2X capable road users, and at operation 310, the sensing coordinator distributes the aggregated sensed information (e.g., via a broadcast or multicast C-V2X communication).

In connection with operation 308, identification of road users without C-V2X capabilities may be based on the following two information elements that may be derived using the disclosed techniques:

a) information on which (neighboring) road users have C-V2X capability (those road users transmit related status information and the need for CP-based information exchange may be limited/inexistent); and b) information on which road users are capable of reliably sense other road users and provide sensed information through the collective perception service.

For information element a), the concerned road user or infrastructure node (also referred to herein as a management entity or a management node) observes C-V2X transmissions of detected neighboring/nearby road users. Those which do not transmit a C-V2X periodic signal (beaconing), such as CAMs or BSMs, may be assumed as non-C-V2X capable road users. Even if those road users can receive C-V2X data, since they are not transmitting, they will also not transmit any redundant information nor occupy the transmission channel.

Figure 4:
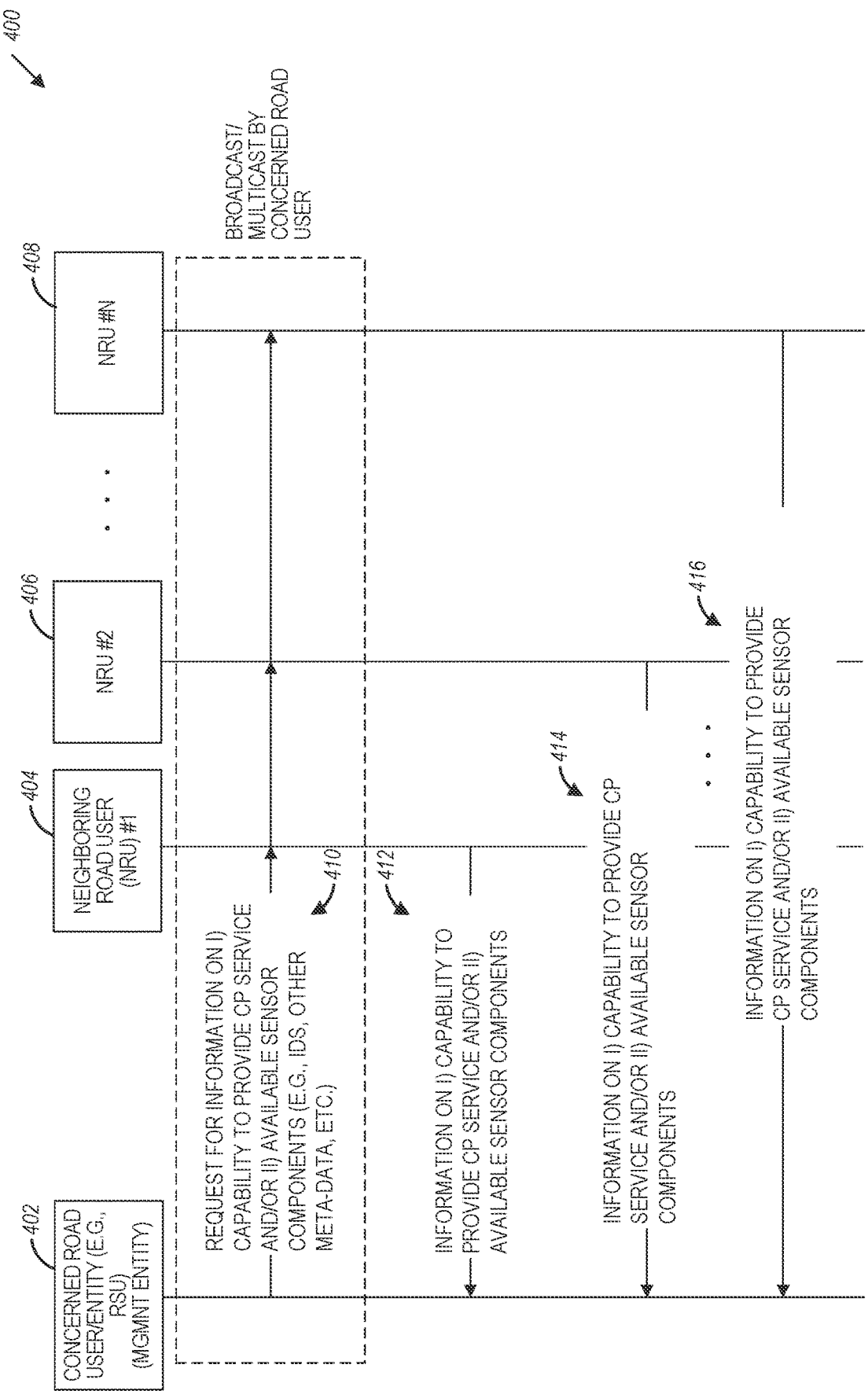
FIG. 4 illustrates a swimlane diagram of a push approach for requesting CP-related information, according to an example embodiment.
Figure 5:
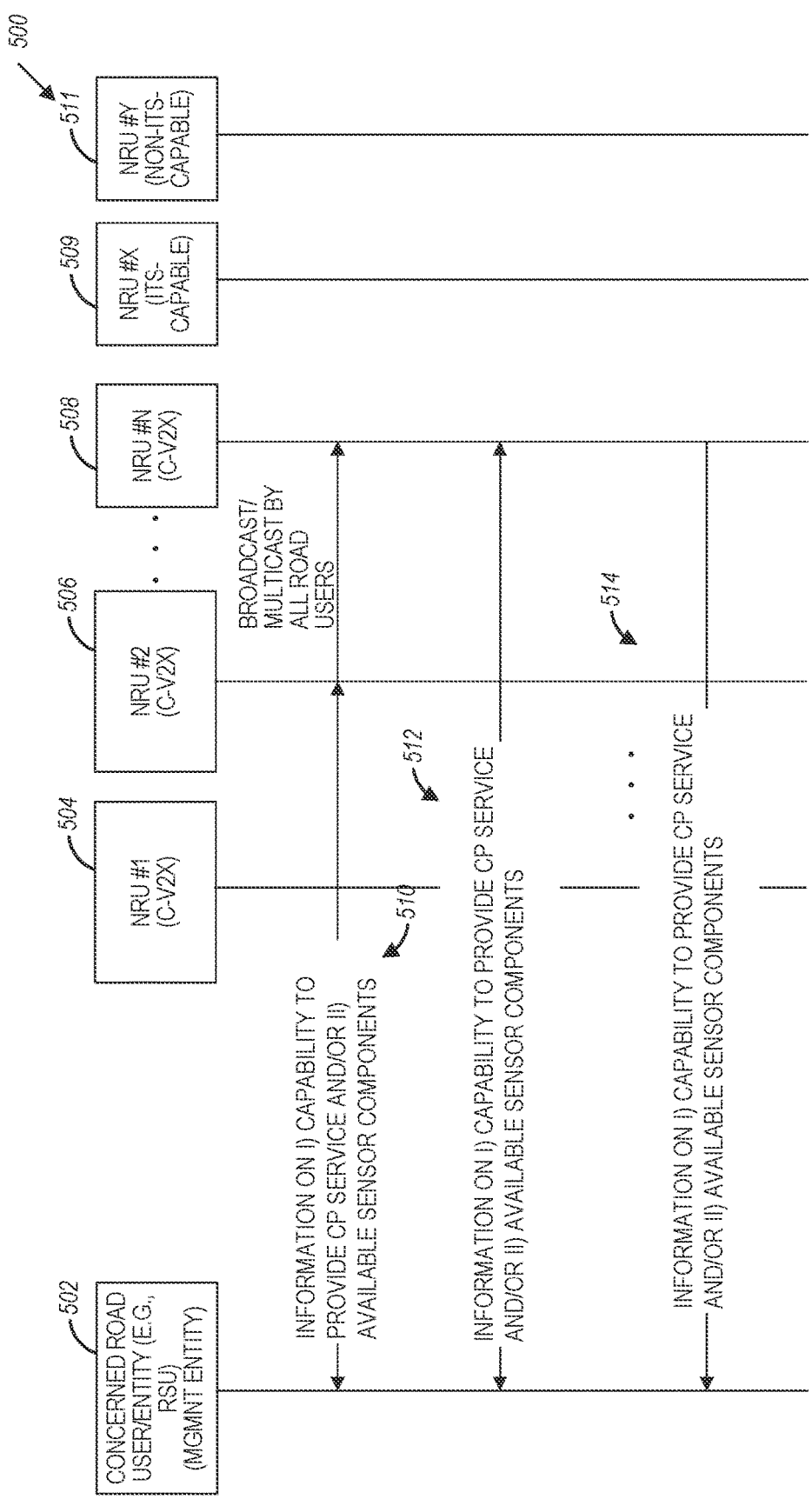
FIG. 5 illustrates a swimlane diagram of a pull approach for requesting CP-related information, according to an example embodiment.

For information element b), such information may be implemented through this process may be implemented through a push approach (e.g., as illustrated in FIG. 4), a pull approach (e.g., as illustrated in FIG. 5), and/or a passive approach.

FIG. 4 illustrates a swimlane diagram of a push approach 400 for requesting CP-related information, according to an example embodiment. Referring to FIG. 4, the push approach 400 may include a concerned road user 402 (e.g., an RSU or another management entity) and neighboring road users (NRUs) 404, 406, . . . , 408. The management entity 402 and the NRUs 404-408 may include vehicles or other moving or stationary nodes associated with road infrastructure (e.g., as illustrated in FIG. 2).

During the push approach 400, the management entity 402 broadcasts (or multi-casts to identified neighboring road users) a request message 410 to confirm the capability to provide collective perception messages (and thus share their sensor data). Optionally, the request message 410 may also inquire further information, for example, a sensor ID or other sensor-related meta-data associated with the sensing capabilities of the NRUs. The latter may be of particular importance for road users that only process shared sensor data provided by trusted, approved, and reliable sensors (e.g., sensors of specific type, model, manufacturer, or capabilities).

NRUs 404, 406, . . . , 408 receiving the request message 410 will provide corresponding response (or answer) messages 412, 414, . . . , 416, indicating whether or not they can provide collective perception messages/information (and optionally, share their sensor data including available sensors, sensor IDs, sensor capabilities, etc.).

FIG. 5 illustrates a swimlane diagram of a pull approach 500 for requesting CP-related information, according to an example embodiment. Referring to FIG. 5, the pull approach 500 may include a management entity 502 (e.g., an RSU or another management entity) and neighboring road users (NRUs) 504, 506, 508, 509, and 511. NRUs 504-508 have C-V2X capabilities, NRU 509 is ITS-capable, and NRU 511 is non-ITS capable. The management entity 502 and the NRUs 504-511 may include vehicles or other moving or stationary nodes associated with a road infrastructure (e.g., as illustrated in FIG. 2).

In the pull approach 500, the management entity 502 does not send a request for capability information to provide CPS and/or information on available sensor components. Instead, all C-V2X capable NRUs 504, 506, . . . , 508 periodically broadcast/multicast this information to all other neighboring road users (e.g., via corresponding messages 510, 512, . . . , 514 illustrated in FIG. 5). As illustrated in FIG. 5, NRUs 509 and 511 do not participate in the C-V2X related communications.

In some aspects, the pull approach may eventually result in more traffic in comparison to the push approach due to the shared information, however, the individual message sizes are still considerably smaller than the regular CAM.

In the passive approach, the management entity does not provide any specific information request to other road users nor broadcasts/multicasts any information on the sensor capabilities. Rather, the management entity observes information being broadcasted by other road users and derives the capability of neighboring road users to use or perform collective perception functionalities to distribute sensing information.

The disclosed techniques may use the approaches discussed in connection with FIG. 6-FIG. 9 for identifying the sensing coordinator at operation 306 in FIG. 3.

In some embodiments, the disclosed techniques may include a negotiation protocol where a given road user or infrastructure distributes an "intention message", which is then approved by other road users through an acknowledgment (ACK) signal. Optionally, an independent "sensing coordinator" may be defined for each equipment manufacturer or vehicle brand. This may be important because vehicle and equipment manufacturers typically only trust the sources which they have themselves under control or special agreements. In some aspects, additional information on the source sensor, for example, a sensor ID, may be attached to the sensing data. In some aspects, a specific vehicle OEM or equipment manufacturers may decide whether or not (and to which extent) the information is trusted and used. Infrastructure/RSUs may be exploited (wherever they are available) to support the coordination of cooperative perception configurations. For example, they can support allocating specific sensing and information distribution tasks to specific vehicles.

Centralized approaches (e.g., through an RSU or central office, for example) for identifying which Road user or infrastructure node may be configured as the sensing coordinator are discussed in connection with FIG. 6, FIG. 7, and FIG. 8.

Figure 6:
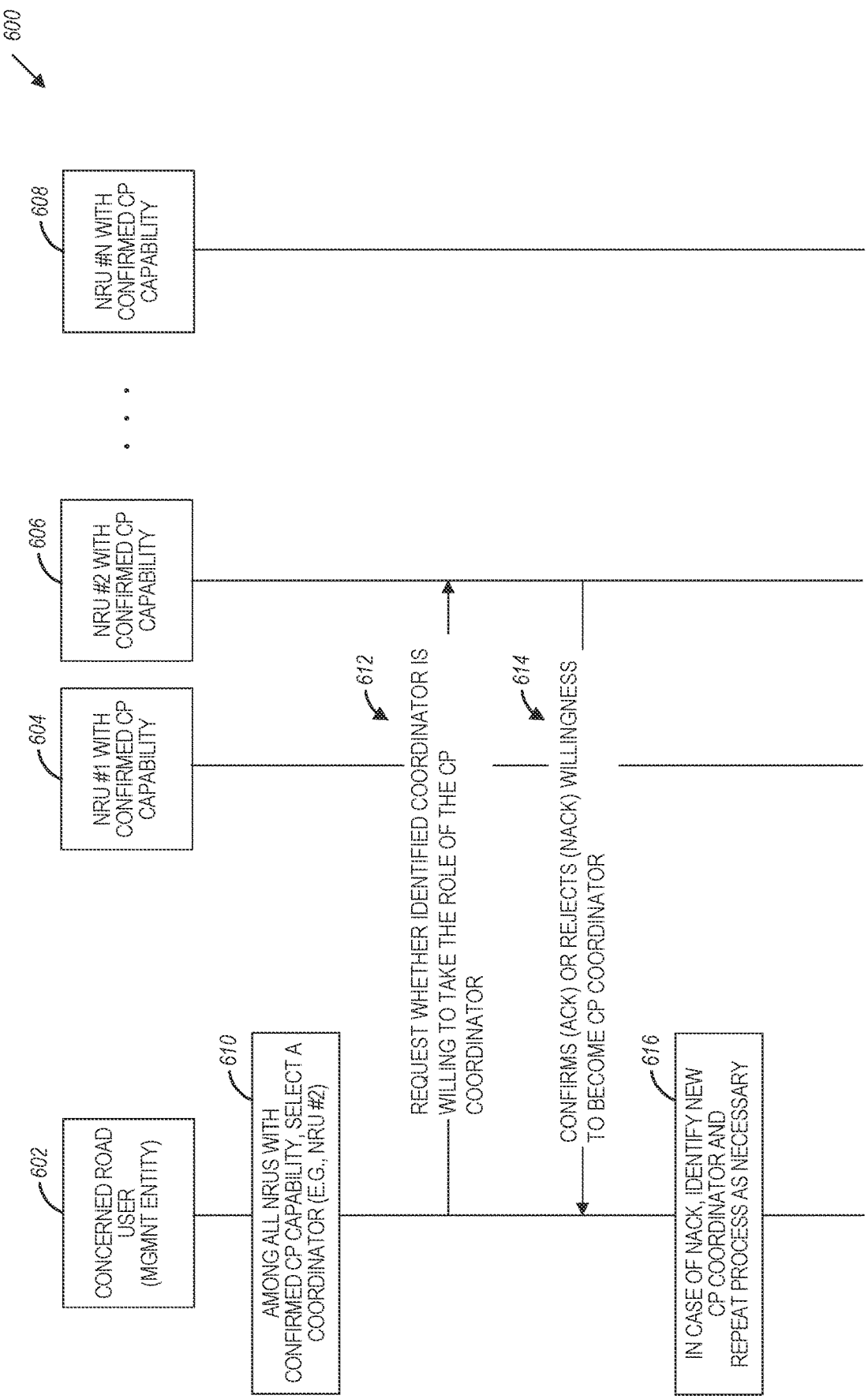
FIG. 6 illustrates a swimlane diagram of a central entity based allocation of a CP coordinator, according to an example embodiment.

FIG. 6 illustrates a swimlane diagram 600 of a central entity-based allocation of a CP coordinator, according to an example embodiment. Referring to FIG. 6, diagram 600 illustrates a management entity 602 (e.g., an RSU or another management entity) and NRUs 604, 606, . . . , 608 with confirmed CP capabilities. The management entity 602 and the NRUs 604-608 may include vehicles or other moving or stationary nodes associated with a road infrastructure (e.g., as illustrated in FIG. 2).

In the centralized approach illustrated in FIG. 6, a central entity, such as a Road Side Unit (RSU) or a central office configured as the management entity 602, will first identify which road user may participate in the collection and distribution of collective perception (CP) information (e.g., by following the approaches discussed in connection with FIGS. 4-5). Then, at operation 610, a sensing coordinator is identified from the responding NRUs (e.g., NRU 606) and is requested to become the collective perception sensing coordinator (e.g., at operation 612) by the management entity 602. In case that the addressed road user (e.g., NRU 606) accepts the request, the road user sends (at operation 614) an acknowledgment (ACK) that it will become the CP sensing coordinator. The sensing coordinator (e.g., NRU 606) then starts providing CP information (e.g., information NRU 606 obtains using its sensors as well as other sensed information obtained from other NRUs via their CP-related transmissions). In aspects when operation 614 includes a rejection ('MACK), the management entity 602 (at operation 616) will identify a new collective perception sensing coordinator and will repeat the process. In aspects when operation 614 includes an acknowledgment (ACK), the management entity 602 (at operation 616) may communicate a notification message for transmission (e.g., for broadcast or multicast transmission) to the NRUs 604-608 to indicate the selection of the sensing node.

As an additional option, certain NRUs may only accept sensor information from certain sources e.g., certain sensors) and not all sources. For example, a (high-quality) manufacturer "A" may not accept sensor data from another (possibly lower quality or less trusted) manufacturer "B". In such a case, the collective perception coordinator may be changed (to such a road user whose sensing data and sensor characteristics are acceptable by the remaining NRUs in the road infrastructure) or multiple collective perception coordinators may be selected such that any of the road users accept the information provided by at least one of the selected collective perception coordinators.

Figure 7:
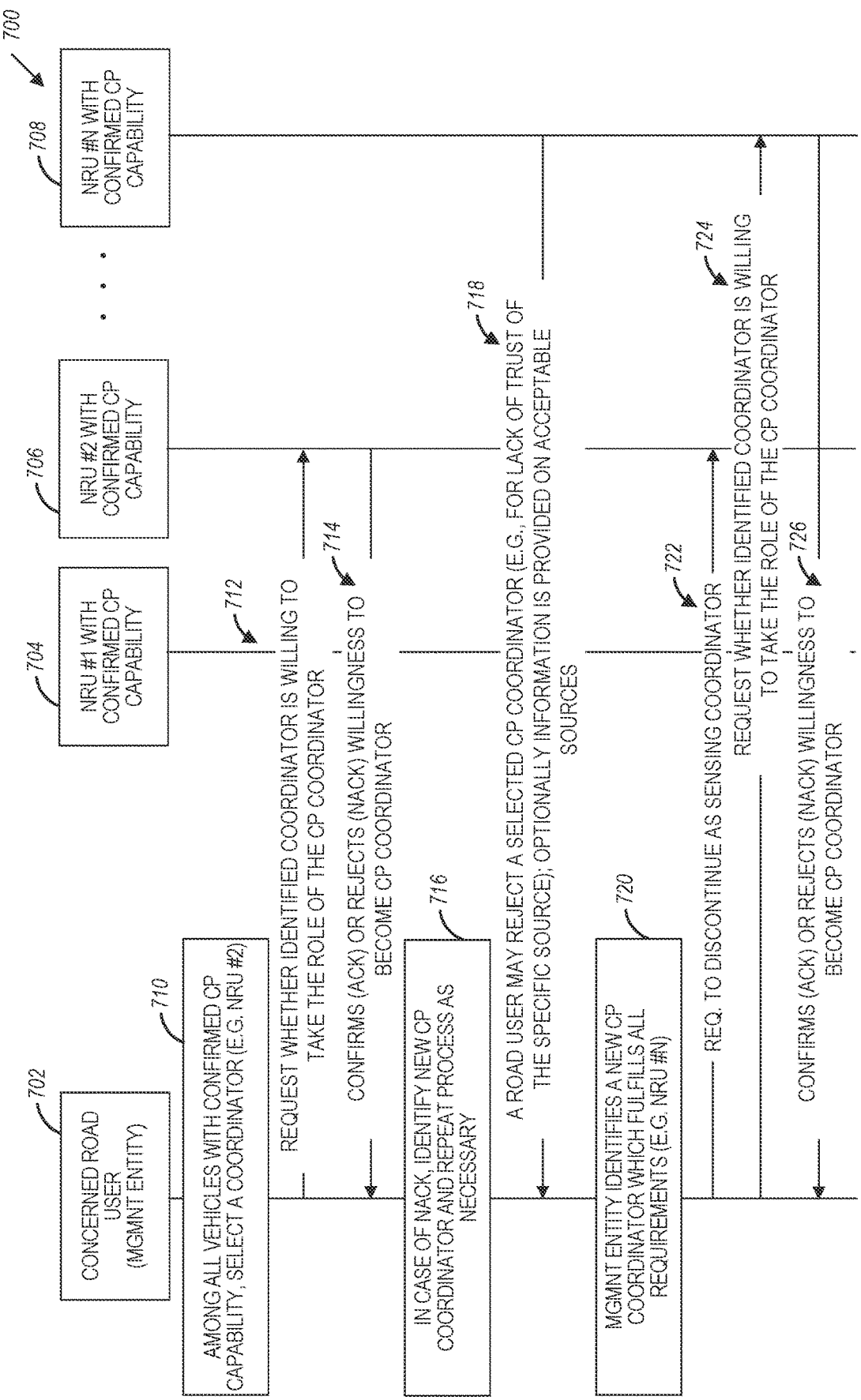
FIG. 7 illustrates a swimlane diagram of switching a CP (or sensing) coordinator, according to an example embodiment.
Figure 8:
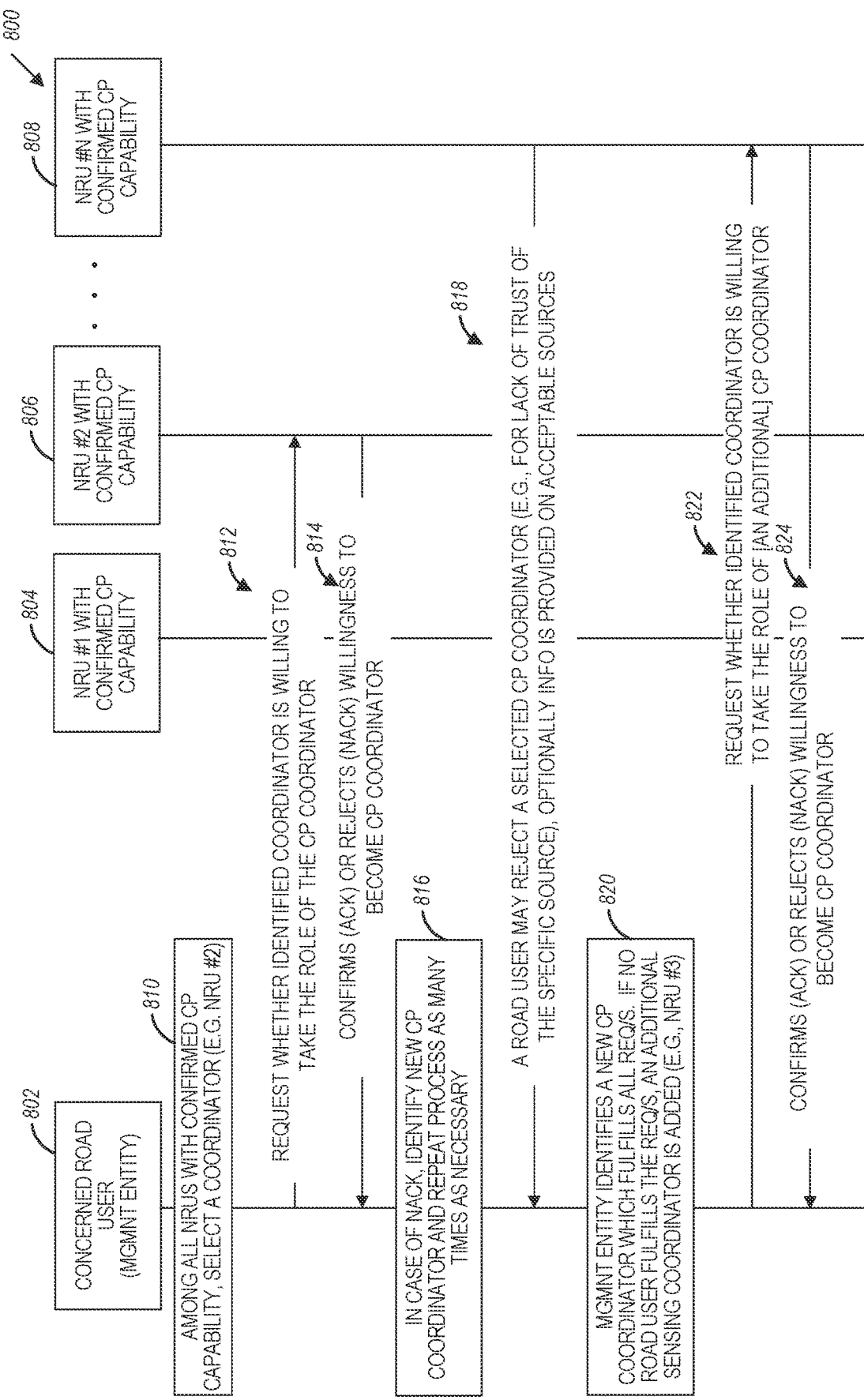
FIG. 8 illustrates a swimlane diagram of adding a new CP (or sensing) coordinator, according to an example embodiment.

An example communication flow for reassigning (or switching) a collective perception coordinator is illustrated in FIG. 7, and adding an extra sensing coordinator is illustrated in FIG. 8.

FIG. 7 illustrates a swimlane diagram 700 of switching a CP (or sensing) coordinator, according to an example embodiment. Referring to FIG. 7, diagram 700 illustrates a management entity 702 (e.g., an RSU or another management entity) and NRUs 704, 706, . . . , 708 with confirmed CP capabilities. At operation 710, the management entity 702 selects a road user (e.g., NRU 706) as the sensing coordinator. At operation 712, the management entity 702 encodes a request message for transmission to NRU 706 (e.g., via a broadcast, multicast, or unicast message), to request whether NRU 706 is available to take the role of the sensing coordinator. At operation 714, NRU 706 communicates back an ACK or NACK to indicate acceptance or rejection of the request to become the sensing coordinator. At operation 716, in case a NACK is received, the management entity 702 identifies a new sensing coordinator and repeats the process as necessary.

After a sensing coordinator (also referred to as a CP coordinator) has been selected, at operation 718, another NRU NRU 708) communicates a rejection of the selected processing coordinator (e.g., for lack of trust of the specific sensing equipment used by the selected coordinator). Optionally, the rejection from NRU 708 further includes information on acceptable sensing equipment. At operation 720, the management entity 702 identifies a new sensing coordinator (e.g., NRU 708) that fulfills the requirements indicated by NRU 708 in the rejection received at operation

718. At operation 722, the management entity 702 communicates a request to the current sensing coordinator (NRU 706) to discontinue as the sensing coordinator. At operation 724, the management entity 702 communicates a request to the newly selected sensing coordinator (e.g., NRU 708) on whether the road user is available to take the role as the new sensing coordinator. At operation 726, NRU 708 communicates an ACK or NACK back to the management entity 702 to indicate confirmation or rejection of the willingness to become the new sensing coordinator.

FIG. 8 illustrates a swimlane diagram of adding a new CP (or sensing) coordinator, according to an example embodiment. Referring to FIG. 8, diagram 800 illustrates a management entity 802 (e.g., an RSU or another management entity) and NRUs 804, 806, . . . , 808 with confirmed CP capabilities. At operation 810, the management entity 802 selects a road user (e.g., NRU 806) as the sensing coordinator, in some embodiments, the management entity may rank the NRUs based on responses from the initial request for information (e.g., as discussed in connection with FIG. 4 in FIG. 5), including information on CP capabilities, sensor availability, sensor capabilities (e.g., number of sensors, sensor IDs, sensor manufacturers, sensor model, possible sensor outputs, etc.), communication link conditions (e.g., interference and bandwidth of the available communication links to the specific road user), road user communication capabilities, etc.

At operation 812, the management entity 802 encodes a request message for transmission to NRU 806 (e.g., via a broadcast, multicast, or unicast message), to request whether NRU 806 is available to take the role of the sensing coordinator. At operation 814, NRU 806 communicates back an ACK or NACK to indicate acceptance or rejection of the request to become the sensing coordinator. At operation 816, in case a NACK is received, the management entity 802 identifies a new sensing coordinator and repeats the process as necessary.

After a sensing coordinator (also referred to as a CP coordinator) has been selected, at operation 818, another NRU (e.g., NRU 808) communicates a rejection of the selected processing coordinator (e.g., for lack of trust of the specific sensing equipment used by the selected coordinator). Optionally, the rejection from NRU 808 further includes information on acceptable sensing equipment.

At operation 820, the management entity 802 identifies a new sensing coordinator (e.g., NRU 808) that fulfills the requirements indicated by NRU 808 in the rejection received at operation 818. At operation 822, the management entity 802 communicates a request to the newly selected sensing coordinator (e.g., NRU 808) on whether the road user is available to take the role of a sensing coordinator. At operation 824, NRU 808 communicates an ACK or NACK back to the management entity 802 to indicate confirmation or rejection of the willingness to become a sensing coordinator (e.g., an additional sensing coordinator as the prior sensing coordinator is also performing those functions).

In some embodiments, the identification of a sensing coordinator from NRUs may be based on a distributed approach (e.g., coordinated among road users in a distributed way, as illustrated in connection with FIG. 9). In the distributed approach, a similar methodology as the methodology used in FIGS. 6-8 may be applied, with the difference that no central (or management) entity coordinates the process. Rather, any road user will observe the distributed information, in case that no collective perception information is broadcasted (or the source of the collective perception information is not acceptable, e.g. it is acquired through a sensor that is considered untrusted by some road user), then the following two approaches may be used in connection with the disclosed techniques:

(a) A concerned road user (which is seeking collective perception information) requests (typically through a broadcast/multicast request message) that one road user takes the role of the collective perception coordinator (optionally including information on requests related to the source, e.g. a list of accepted sensor devices). Other road users will receive the request and a road user may agree to become the collective perception coordinator (typically the first road user which answers to the request). Example processing using this approach is illustrated in connection with FIG. 9.

(b) A concerned road user may identify that no collective perception data is being provided (or only such data is provided which is originating from untrusted sources). The concerned road user may self-declare itself to be the new collective perception sensing coordinator position and start distributing collective perception-related information.

Figure 9:
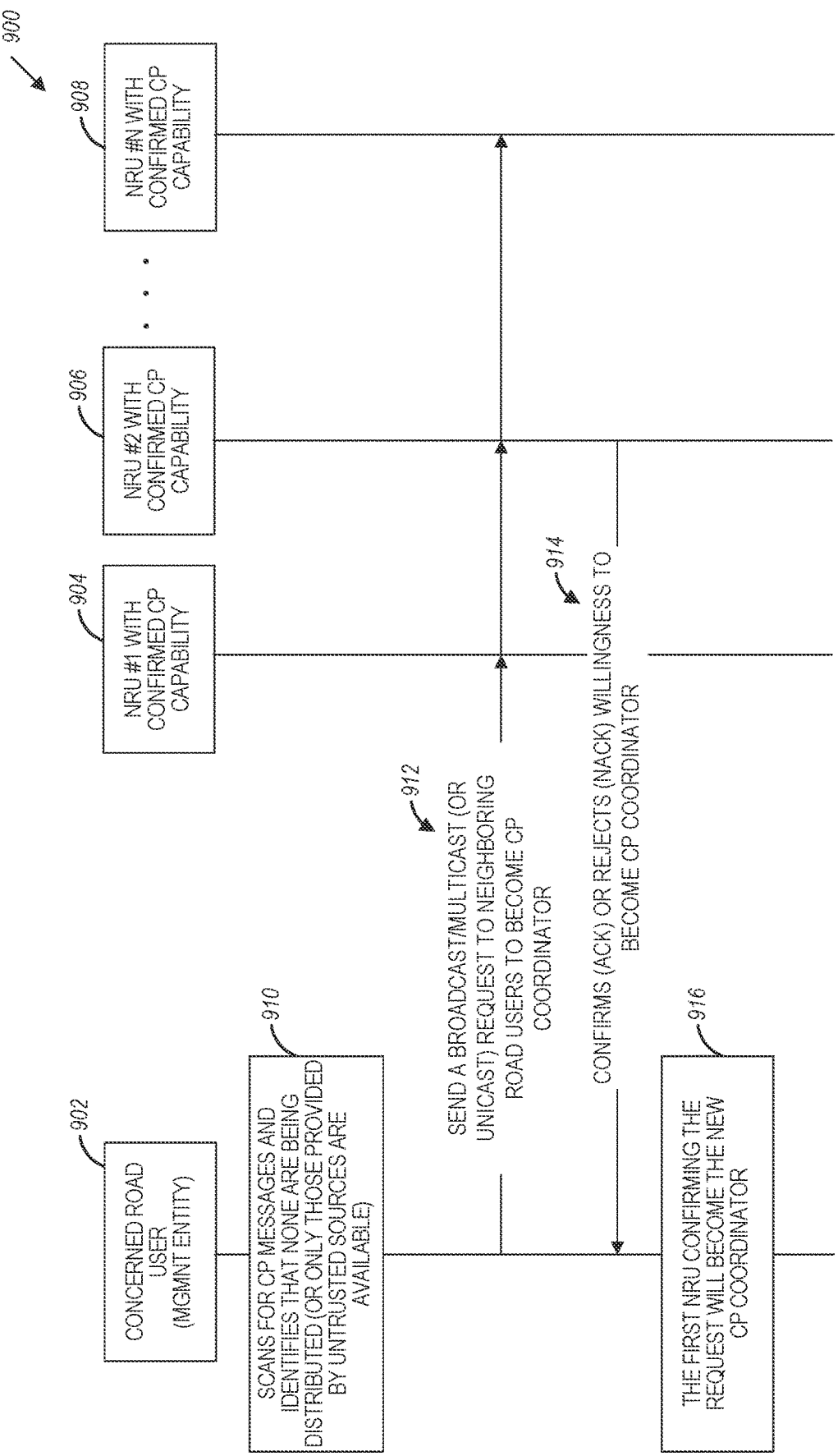
FIG. 9 illustrates a swimlane diagram of a distributed identification of a CP coordinator, according to an example embodiment.

FIG. 9 illustrates a swimlane diagram 900 of a distributed identification of a CP coordinator, according to an example embodiment. Referring to FIG. 9, diagram 900 illustrates a management entity 902 (e.g., an RSU or another management entity) and NRUs 904, 906, . . . , 908 with confirmed CP capabilities. At operation 910, the management entity 902 scans the communication spectrum for CP messages and identities that none are being distributed (or identifies CP messages provided by entrusted sources). At operation 912, the management entity 902 communicates a broadcast (or a multicast or a unicast) request to the other NRUs to become a sensing coordinator. At operation 914, one of the NRUs (e.g., NRU 906) communicates an ACK or NACK back to the management entity 902 to indicate confirmation or rejection of the willingness to become the sensing coordinator. At operation 916, the first NRU to respond with an acknowledgment (e.g., NRU 906) becomes the sensing coordinator.

In some embodiments, the following techniques may be used for aggregating and distributing sensitive information. Information categories may be defined and the information from different road users may be statistically processed and provided (e.g., by a sensing coordinator) within the corresponding category fields. The sensing coordinator will then share the sensor data by segmenting the aggregated information based on, e.g., the following categories:

(a) Passive objects (e.g., stationery objects that are not classified as road users) information: the size of the objects, estimated location information (if identifiable and provided by a road user), and the type of object.

(b) List of non-V2X-capable road users: for example, road users which are moving and may not be equipped with V2X communications.

(c) Information on overlapping FoV: for each of the neighboring road users, where an identified overlap of the FoV is identified, additional information is provided including which of the sensors the overlap has been identified as well as the overlapped sensed data. This information may assist other road users to consolidate what they sense with what is sensed by other NRUs.

An example high-level data structure of a message with consolidated/aggregated sensed data communicated by a sensing coordinator is illustrated below in the following Table 1:

TABLE 1

| Message Headers | Passive objects information | Non-V2X capable road users | Information on overlapping FoV |
|---|---|---|---|

In some embodiments, optionally, a "level of trust" (LoT) may also be included in the aggregated sensed data. The LoT may relate to i) each information element, and/or ii) groups of information elements, and/or iii) to all available information elements combined and communicated in an aggregated sensed data communication. This LoT information may consist of any number "N" of levels, e.g. level "0" corresponds to a very low level of trust (i.e., the information is very uncertain) while the highest level "N-1" corresponds to a very high level of trust (note that 100% certainty may be difficult to achieve, but it may be approached very closely, e.g. 99.9999% or similar). Any LoT between "0" and "N-1" indicates a correspondingly intermediate level of trust. The scale being used for the LoT may be linear, logarithmic, or any other type of scale.

In some embodiments, the level of trust may be determined as follows:
  (a) the LoT may be based on whether there is contradicting information being provided by other vehicles or by the sensors of a given vehicle. For example, some information sources (in-vehicle sensors, information by other vehicles, etc.) may indicate that a vulnerable road user (VRU) is located in front of a vehicle while a given sensor is indicating that there is no VRU present (i.e., conflicting information is available). In case that all available information sources indicate the same observation, the level of trust is typically high. In aspects when a number "K" of the sources provide conflicting information compared to the other sources, the overall level of trust is lower.
  (b) In some aspects, the "information certainty" by an individual sensor may be taken into account. A sensor may either provide a "hard" information element (e.g., a VRU is either present or not present) or a "soft" information element (e.g., a VRU is detected with a probability of a certain level). When such soft information element is provided, it can be used as a measure of the level of trust. For example, if conflicting information elements are linked to a low probability level, the information element can typically be discarded or considered with great care. If conflicting information elements are linked to a higher) probability level, then the situation is more complicated (e.g., some sensors may indicate that there is a VRU with a high-level probability/certainty and other sensors indicate that there is no VRU equally with a high level of probability/certainty) and the level of trust in the information provided is typically reduced.

Some options on how to include the "level of trust" information in an aggregated sensed data communication are indicated below in Tables 2-7:

Option 1: Table 2 indicates an individual level of trust for each information element.

TABLE 2

| Message Headers | Passive objects information Include a "level of trust" for each information element individually | Non-V2X capable road users Include a "level of trust" for each information element individually | Information on overlapping FoV Include a "level of trust" for each information element individually |
|---|---|---|---|

Option 2: Table 3 indicates an individual level of trust for some information elements (typically, the information on a level of trust is not provided by all information sources).

TABLE 3

| Message Headers | Passive objects information Include a "level of trust" for some information element individually (typically provided by such sources that can assess the level of trust) | Non-V2X capable road users Include a "level of trust" for some information element individually (typically provided by such sources that can assess the level of trust) | Information on overlapping FoV Include a "'level of trust" for some information element individually (typically provided by such sources that can assess the level of trust) |
|---|---|---|---|

Option 3: Table 4 indicates a single (aggregate) level of trust is provided for each category.

TABLE 4

| Message Headers | Passive objects information Include a single (aggregate) "level of trust" for all information elements combined | Non-V2X capable road users Include a single (aggregate) "level of trust" for all information elements combined | Information on overlapping FoV Include a single (aggregate) "level of trust" for all information elements combined |
|---|---|---|---|

Option 4: Tables 5-7 indicate a single (aggregate) level of trust provided for several categories that are combined.

TABLE 5

| Message Headers | Passive objects information Include a single (aggregate) "level of trust" for all information elements combined of several information categories | Non-V2X capable road users | Information on overlapping FoV Include a single (aggregate) "level of trust" for all information elements combined |
|---|---|---|---|

TABLE 6

| Message Headers | Passive objects information Include a single (aggregate) "level of trust" for all information elements combined | Non-V2X capable road users Include a single (aggregate) "level of trust" for all information elements combined | Information on overlapping FoV |
|---|---|---|---|

TABLE 7

| Message Headers | Passive objects information Include a single (aggregate) "level of trust" for all information elements combined | Non-V2X capable road users | Information on overlapping FoV |
|---|---|---|---|

The overall message flow is illustrated in connection with FIG. 10. FIG. 10 illustrates a swimlane diagram 1000 of aggregation of information and re-distribution of information among computing devices, according to an example embodiment. Referring to FIG. 10, diagram 1000 includes a management entity 1002 (e.g., an RSU or another management entity) and neighboring road users (NRUs) 1004, 1006, ..., 1008, and 1010, ..., 1012. NRUs 1004-1008 have C-V2X capabilities (e.g., confirmed CP capabilities) and NRUs 1010-1012 are with or without CP capabilities. The management entity 1002 and the NRUs 1004-1012 may include vehicles or other moving or stationary nodes associated with a road infrastructure (e.g., as illustrated in FIG. 2). In the example of FIG. 10, it may be assumed that the management entity 1002 is also the sensing coordinator.

At operation 1014, NRUs 1004-1008 (with confirmed CP capabilities) provide information (e.g., CP information such as sensed data) on observations performed by sensors of such NRUs. Optionally, the information provided to the sensing coordinator 1002 further includes LoT information. At operation 1016, the sensing coordinator 1002 combines/aggregates the information into one or more messages. At operation 1018, the aggregated information is communicated to NRUs 1004-1012 in the associated road infrastructure e.g., via a broadcast or multicast communication using one or more wireless links).

In some aspects, sensing technologies of self-driving vehicles rely on the constant perception of the surrounding dynamic environment to perform maneuvers. Once the vehicle's sensors (e.g. Lidar, radar, cameras) are compromised by an attacker, it is unable to capture dynamic aspects of the road and correctly perceive the road infrastructure environment. Being unable to navigate under adversarial circumstances can have severe safety consequences, Thus, the disclosed techniques further include enhanced sensing methods that can be useful to maintain the control of the vehicle under a cyberattack.

Built-in safety models could detect certain anomalies and bring the vehicle to a degraded mode of operation. While in degraded modes, the vehicle may try to reach safe states that maximize the safety of the occupants, which, depending on the problem, may include blindly steering to the side or even stopping in the middle of the road. Without a good perception of the environment, it is difficult to perform a reliable contingency maneuver. Complementary road information can be provided online via maps and locations of elements of the road, as well as policies that provide a safety framework on the safe distances around the vehicle. However, such complementary road information does not resolve the problem due to the following limitations.

Degraded vehicle modes of operation carry associated safety risks. Safety-based policies may rely on some perception and can become incapable of determining which action to take as there may be no pre-established safe zones and the vehicle control system can no longer rely on the required perception.

In some aspects, the disclosed techniques may rely on using V2X communication with other vehicles of the fleet in the vicinity of the ego vehicle as well as the infrastructure, to establish keep-out zones and build a safe drivable region of the road infrastructure environment. This functionality enables the ego vehicle to make informed safe decisions even without full perception of the surroundings. In some aspects, as the ego vehicle drives, it keeps building a blueprint of alternative/backup trajectories. This enables the proactive mapping of recovery paths that the ego vehicle can use to quickly react in the event of contingencies (e.g., road emergencies). By utilizing the disclosed enhanced methods for sensing, autonomous systems (e.g., autonomous vehicles) may become more efficient and resilient to cyber-attacks.

Figure 11:
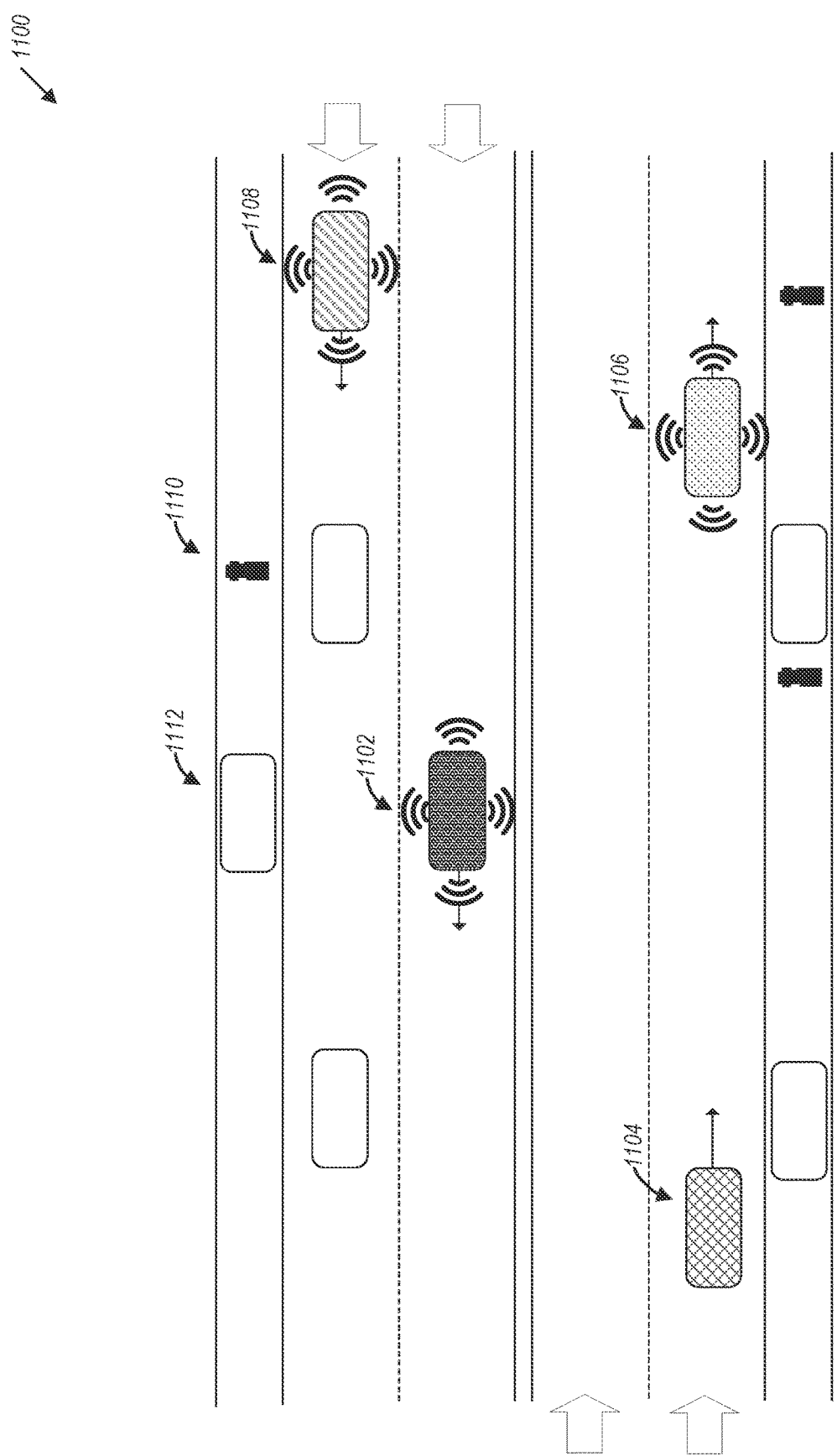
FIG. 11 illustrates a driving scene where the disclosed techniques may be used, according to an example embodiment.

FIG. 11 illustrates a driving scene where the disclosed techniques may be used, according to an example embodiment. Referring to FIG. 11, road users (e.g., vehicles) 1102, 1104, 1106, and 1108 may be moving on a two-lane road 1100. The vehicles 1102-1108 may be associated with the same vehicle fleet. In FIG. 11, pedestrians are represented with icon 1110, and other vehicles 1112 (e.g., vehicles not associated with the fleet) that are present on the road. Perception of the vehicles in the fleet (e.g., sensing directions) are represented by waves in the proximity of the vehicles.

Vehicles 1102-1108 of the fleet are navigating the road 1100 and sensing the surroundings. In some aspects, vehicle 1104 has lost some of its perception (e.g., sensing) capabilities. Even when partial perception is lost, the vehicle may start to engage in degraded modes of operation. For instance. When a front sensor is malfunctioning or is attacked, vehicle 1104 would start to take safety precautions to maximize the overall safety of the vehicle. Different levels of degradation may be implemented into self-driving vehicles and are orchestrated by policies depending on the type of failure and the possible impact on the vehicle. Though such functionality may assist vehicle 1104 to navigate, it does not provide the latest dynamics context of the road. Hence, to perform safe contingency maneuvers, it may be necessary to have a fresh set of conditions of the road which captures pedestrians 1110 and other vehicles 1112 currently in transit.

Figure 12:
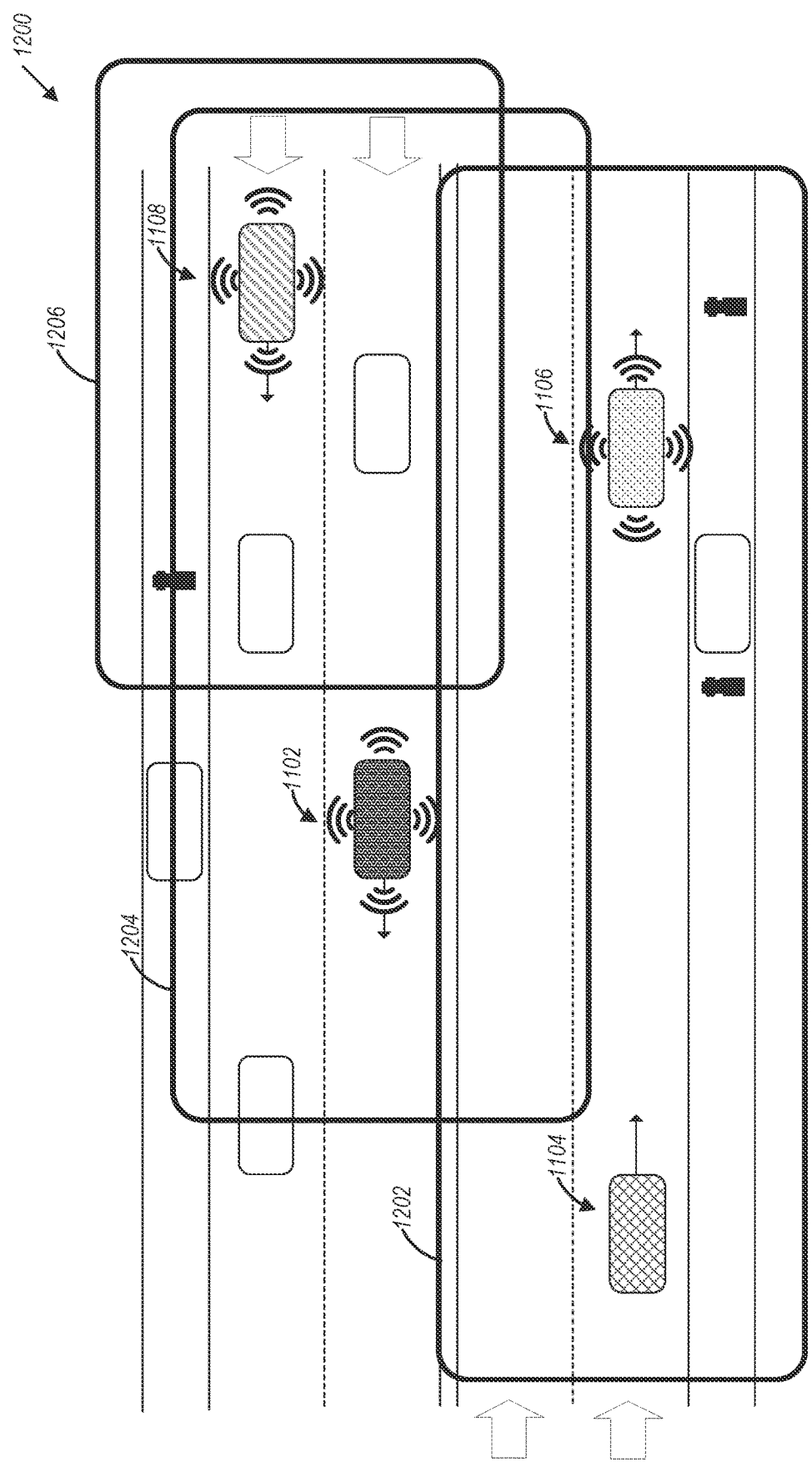
FIG. 12 illustrates example perception areas in the driving scene of FIG. 11, according to an example embodiment.

FIG. 12 illustrates a diagram 1200 of example perception areas in the driving scene of FIG. 11, according to an example embodiment. Each vehicle of the fleet of vehicles 1102, 1106, and 1108 covers an area around it through its perception, represented in FIG. 12 by areas 1204, 1202, and 1206 respectively, around each vehicle. The vehicles also carry the observations made in the recent past through their perception. For instance, the vehicle perception areas 1202, 1204, and 1206 respectively of vehicles 1106, 1102, and 1108 expand to the region (behind them) that they just navigated.

Though the disclosed techniques are exemplified through vehicles on the road, perception can be provided by RSUs and drones (or other road users), which may act as mobile roadside units. In some aspects, RSUs can complement perception and provide additional guidance to vehicles. If multiple static and mobile RSUs are combined, the vehicle is provided with a comprehensive set of information about the dynamic environment, which enables a fine-grained response to the lack of proper sensing. Furthermore, the RSU and vehicle can form a closed-loop, where the RSU can sense the vehicle and provide instructions on the next set of feasible and safe behaviors. Since the RSU has limited coverage, it can pass this monitoring on to other RSUs in the vicinity that would continue the interaction with the vehicle in trouble.

Figure 13:
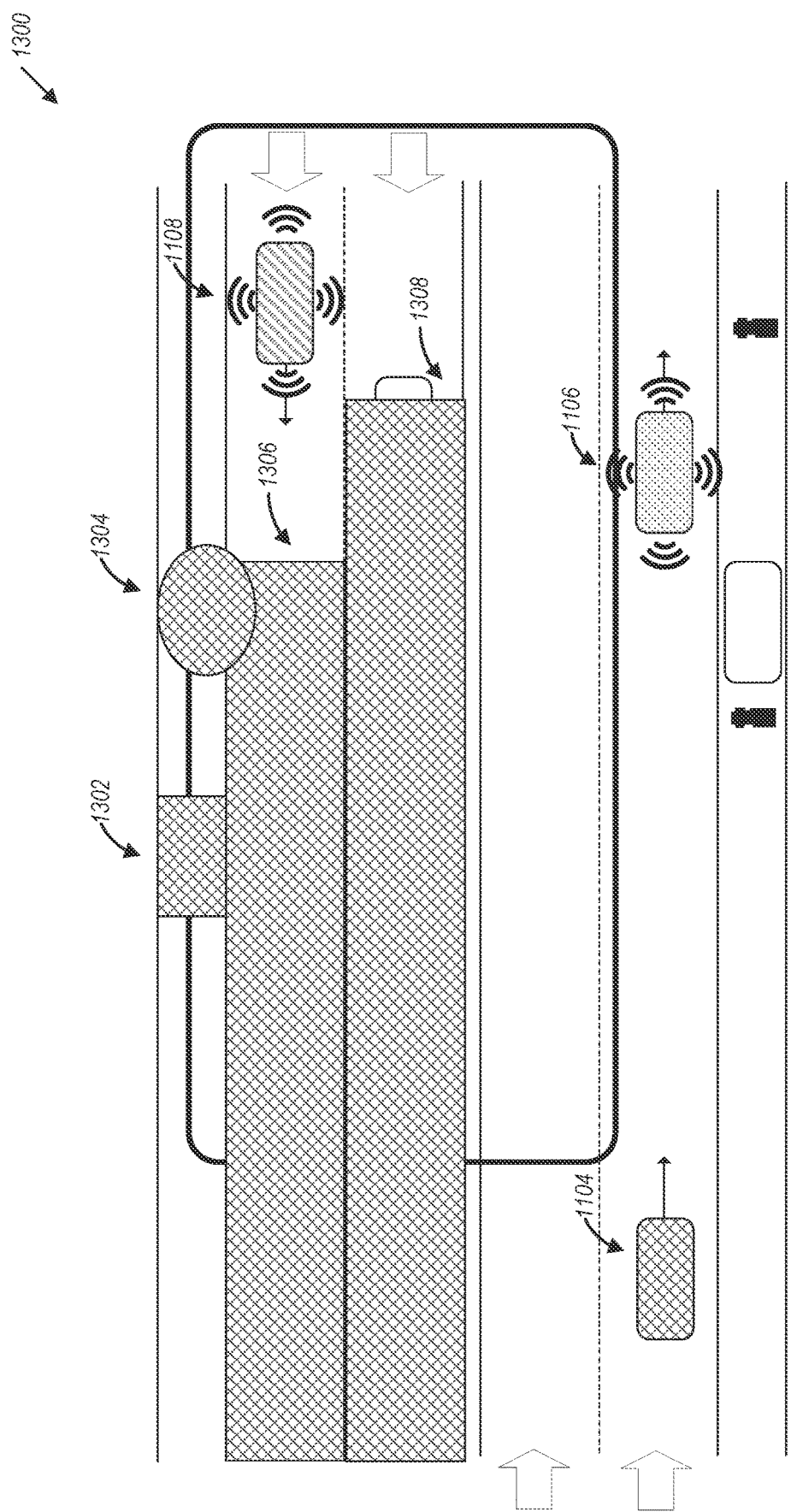
FIG. 13 illustrates example keep-out zones based on perception areas, according to an example embodiment.

FIG. 13 illustrates a diagram 1300 of example keep-out zones based on perception areas, according to an example embodiment. Referring to FIG. 13, 1102-1108 may use perception/sensing capabilities to build their perceived keep-out zones. As used herein, the term "keep-out zone" indicates an area in a road infrastructure e.g., on a road or in the vicinity of a road) that include dynamic objects (e.g., road users moving on the road or in the vicinity of the road, or stationary objects present near the road), such as vehicles, pedestrians, and objects. For example, FIG. 13 illustrates keep-out zones 1302 (due to the presence of a non-fleet vehicle). 1304 (due to the presence of a pedestrian), 1306 (due to a moving non-fleet vehicle), and 1308 (due to the presence of moving fleet vehicle 1102. Even though FIG. 13 illustrates keep-out zones associated with vehicle 1108, other vehicles of the fleet may also determine their keep-out zones as well in a similar fashion.

Figure 14:
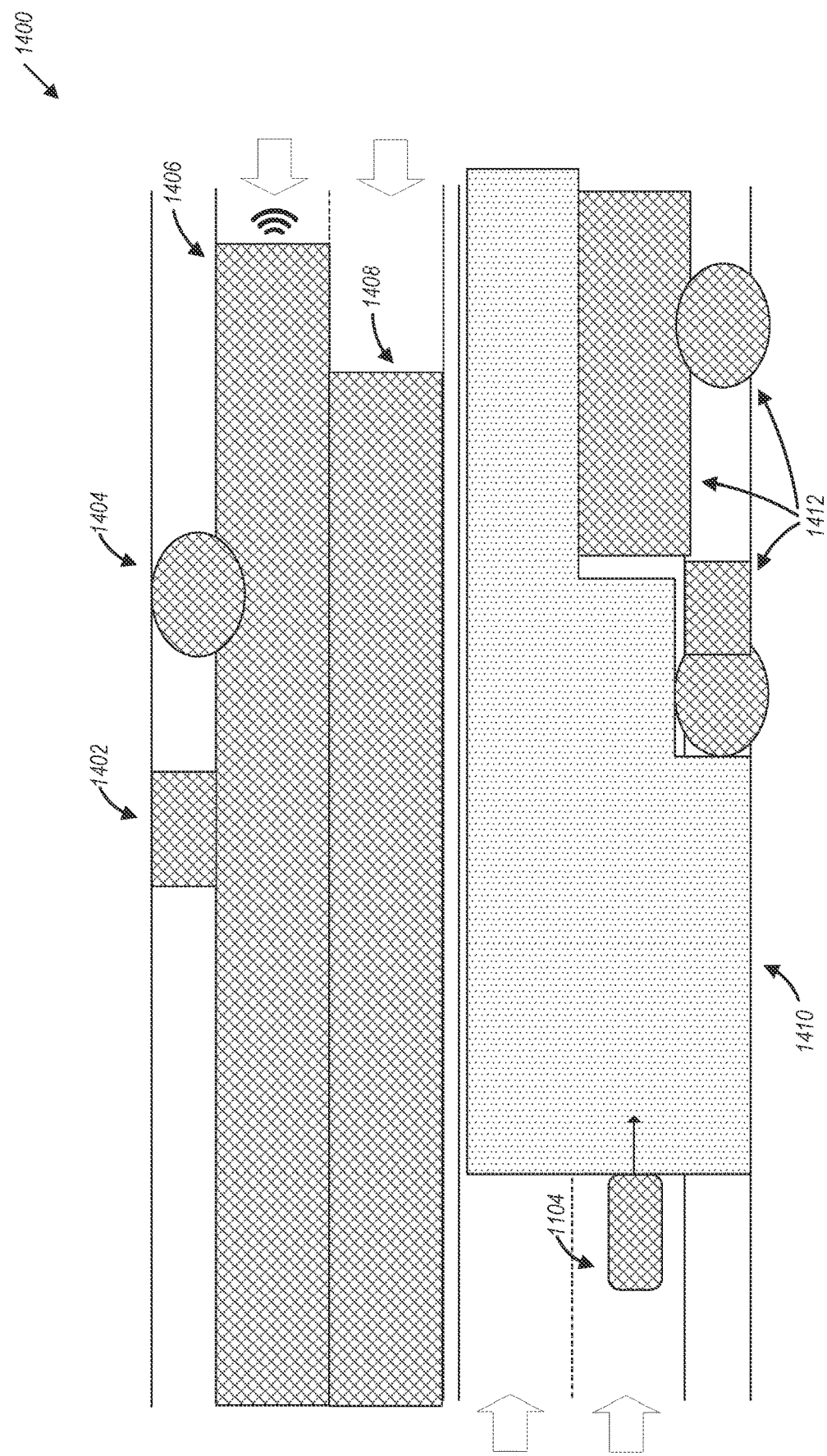
FIG. 14 illustrates an example drivable area based on the keep-out zones of FIG. 13, according to an example embodiment.

FIG. 14 illustrates a diagram 1400 of the collection of keep-out zones of FIG. 13, which forms an example drivable area, according to an example embodiment. Referring to FIG. 14, there are illustrated keep-out zones 1402, 1404, 1406, 1408, and 1412 which may be determined by fleet vehicles (e.g., vehicles 1102, 1106, and 1108) using the disclosed techniques.

The determined keep-out zones may be shared between vehicles of the fleet (e.g., as CP data communicated via one or more wireless links within a road infrastructure). In this regard, ego vehicle 1104 may receive the keep-out zones determined by the other fleet vehicles. The collection of keep-out zones 1402, 1404, 1406, 1408, and 1412 allows the ego vehicle to determine what is drivable ahead, namely, drivable area 1410. In case of contingency (e.g., a road emergency), the ego vehicle would take actions based on the drivable area 1410. Data provided by the ego vehicle without perception may be expected to come in different moments in time. Thus, the ego vehicle 1104 may build the drivable area 1410 over time. In some aspects, the drivable area is dynamic, i.e., it changes over time, as new data is collected from vehicles/RSUs. In some aspects, the ego vehicle 1104 may take additional information, such as its speed, to capture the dynamics of its movement as well as the movement of the other road users on the road to adapt to the upcoming actions within the drivable area 1410 and thus maximize safety.

If information about a certain area around the vehicle is not received, it is assumed as a keep-out area by default, until the information is received from other vehicles. The tolerable timing delay until receiving full information about the drivable area is bounded by the last valid sensing of the ego vehicle, its speed, and distances to the vehicle positioned in front of it. Changes in the scenario in front of the vehicle (e.g., cut-ins, preceding vehicle reducing speed, etc.) tighten the bounds of the drivable area 1410. To counteract this, a distance safe buffer may be used to increase the survivability of the ego vehicle until it receives information about the road from neighboring vehicles. The ego vehicle 1104 may cautiously reduce speed as a mechanism to increase the distance to objects that may be present in the road ahead.

In some aspects, the ego vehicle 1104 may receive information from one or more of the neighboring vehicles on the road. However, if higher levels of trust are required for the information received, it would be appropriate to rely on information supplied by the vehicles that can provide a certain level of trust. To achieve that, groups could be formed, which normally occur in fleets.

In some aspects associated with emergency maneuvering, the ego vehicle, under normal circumstances, is relying on a best effort to avoid an accident. Without perception, the ego vehicle is driving blind and cannot do much to guarantee that its maneuvers are safe. Having a blueprint on where it can drive provides an improvement on the possible actions that can be taken that minimizes the risk of an accident.

Figure 15:
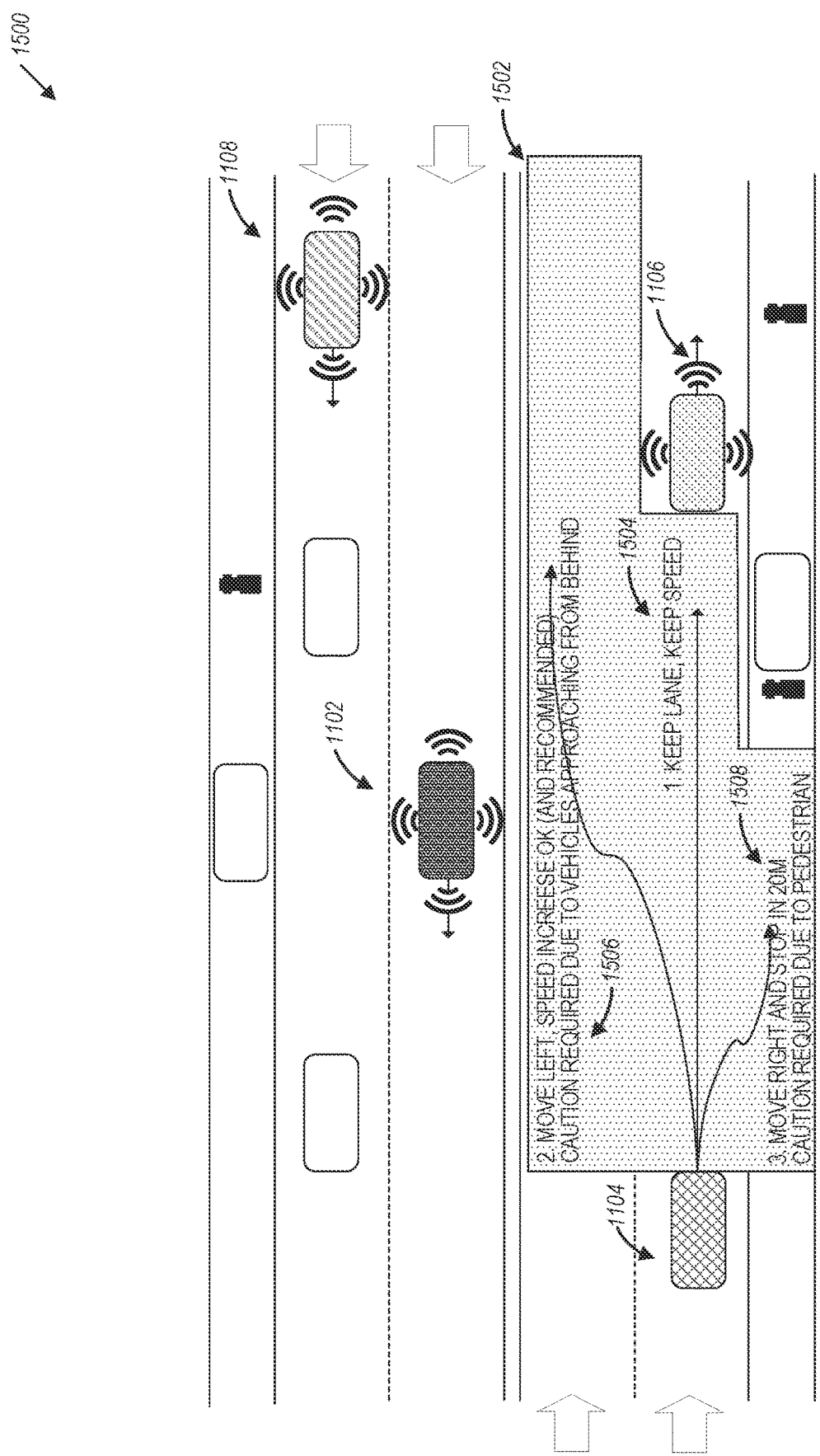
FIG. 15 illustrates vehicle navigation based on determined drivable area, according to an example embodiment.

FIG. 15 illustrates a diagram 1500 of vehicle navigation based on determined drivable area, according to an example embodiment. Referring to FIG. 15, ego vehicle 1104 may determine a drivable area 1502 based on the disclosed techniques. In the use case illustrated in FIG. 15, vehicle 1104 has the following three options (e.g., options 1504, 1506, 1508) that are determined based on the drivable area 1502. Even though FIG. 15 illustrates three options, the disclosure is not limited in this regard and other navigation options may also be configured/determined based on the disclosed techniques.

Option 1504: There is room between vehicle 1104 and vehicle 1106 (which is positioned in front of vehicle 1104, in the direction of traffic). The distance of the available road in front of the ego vehicle 1104 may be calculated based on the keep-out areas received from the other vehicles. In this case, the ego vehicle 1104 may keep the same lane and maintain the same speed during the recovery procedure. Some gradual speed reduction of vehicle 1104 is acceptable.

Option 1506: The ego vehicle 1104 can also move to the left lane as it travels in the direction of traffic. The amount of lateral space available can also be computed from the keep-out zones provided by the other vehicles. The amount of lateral movement can be computed based on the steering angle and speed of the vehicle. Vehicle 1104 may keep its speed, but it may be recommended to increase the speed since other vehicles may be approaching from behind on the left lane at a higher speed.

Option 1508: The ego vehicle 1104 can also pull over to the shoulder. However, vehicle 1104 may have to determine (e.g., based on the drivable area 1502) if there are obstacles on the shoulder and the amount of space available to complete a full stop.

In some embodiments, a policy may be used to guide the decision-making of the possible vehicle maneuvers based on a determined drivable area. This approach can increase the survivability of the vehicle until recovery functions are completed. In some aspects, to enable this decision-making process, a protocol is needed for the vehicle in need of help, that is, the ego vehicle with sensing capability somewhat compromised, to request help from the other vehicles in the fleet and the infrastructure nearby. One embodiment of this protocol may use the following processing options:

(a) The vehicle in need informs the fleet manager (in the cloud or another NRU such as a management entity or sensing coordinator) that its sensors are compromised, with its current location, known states before the compromise and specific blind spots that are urgently in need of assistance from the fleet Upon receiving this request, the fleet manager may identify other vehicles nearby of the requesting vehicle and notify them of the help needed. The fleet manager may also reply to the requesting vehicle with a list of potential neighbors that are part of the same fleet and can be trustworthy.

(b) The same message in (a) may also be broadcast directly over the air to the ego vehicle's neighboring vehicles, in case that some of the neighboring vehicles are part of the same fleet and can offer immediate help. This can potentially reduce the latency of getting the help compared to performing option (a) only. Upon receiving the request, the neighboring vehicles that are part of the same fleet may voluntarily start sharing the perception information relevant to the requesting vehicle, such as the keep out zone, etc.

(c) The request and response protocol in options (a) and (b) may be repeated periodically until the ego vehicle reaches a safe end state (e.g., pulls over to the shoulder or exits the highway to a safe stop) or recovers its compromised sensors, as it needs continuous dynamic information from the other vehicles in the fleet.

A road intersection may include multiple road users, such as several cameras and sensors along with multiple RSUs and edge platforms/nodes. The cameras/sensors may be mounted on fixed road infrastructure as well as on various vehicles or other moving road users. In some aspects, information from the sensors may be used to provide safety for pedestrians and vehicles by constructing occupancy grid maps (OGMs) that can be shared with other road users (e.g., vehicles as well as non-moving road users such as infrastructure nodes or other intelligent infrastructure objects).

Generating an OGM of a dense road intersection with high accuracy and low latency is a complex problem. Streaming raw camera feeds to RSUs or edge nodes is not a trivial task due to high bitrate traffic load, limited wireless bandwidth, and stringent latency requirements. In some aspects, the disclosed techniques may be used to distribute analytics compute between intelligent cameras and RSUs or edge nodes.

In some aspects, the camera traffic from multiple cameras may be fed to the RSU or edge node for performing analytics (e.g., to perform object detection and generate an OGM) at the RSU or edge node. This type of processing, however, may be associated with high latency due to (i) streaming high bit rate camera feeds over bandwidth-limited wireless channels, and (ii) heavy workload complexity for analytics at the edge nodes. Furthermore, many kinds of vehicles and pedestrians may be involved, with different sensor quality information. Even for the sensors in the fixed infrastructure, the fields of view and resulting confidence in the analytics results are different.

The disclosed techniques may be used to perform the following processing functions associated with OGM generation: (1) selecting a proper set of cameras to associate with each RSU or edge node; (2) distributing analytics compute between intelligent cameras and the RSU or edge node; (3) fusing the information from multiple cameras and RSUs to form a unified occupancy map (e.g., an OGM) in a bandwidth-efficient, reliable, and low latency manner.

The implementation of the above-listed techniques is based on the following:

(a) Combining the hierarchical architecture of the system as in processing Function (1) (below) that enables optimal sensor selection and association with the different RSU or edge node based upon several factors (e.g., camera/sensor mobility and location, network bandwidth, compute server load, etc.).

(b) Combining the distribution of convolutional neural network (CNN) processing as in Function (2) (discussed below) between the sensor/camera and the RSU or edge node in a manner that optimizes the compute split of the deep CNN between the two ends, the compression of the data transferred between the two ends (bandwidth constraint) and the end-to-end key performance indicators (E2E KPIs) such as accuracy of the OGM constructed, the latency, etc. Further, the deep features extracted by the individual sensor processing can be processed by a common task-specific deep CNN at the RSU or edge node that fuses the feature maps from different sensors to produce a version of the OGM for that RSU.

(c) Combining the deep CNN-based OGM construction approach in function (2) along with multiple sensor fusion (e.g., by using a Bayesian filtering approach), producing Function (3) (discussed below).

Function (1): Dynamic Optimal Association Between Sensors/Cameras and RSUs or Edge Nodes In some embodiments, it is foreseeable that there will be a large number of sensors (e.g., cameras, lidar, etc.) in a road infrastructure (including vehicles), which may all be linked via wireless networks to cloud and edge compute. To efficiently process large volumes of sensor data from these sensors and provide accurate, timely information in the form of OGMs to users, the disclosed techniques may first be used to establish a hierarchy of sensors associated with RSU or edge servers which are further networked to each other, as shown in FIG. 16.

Figure 16:
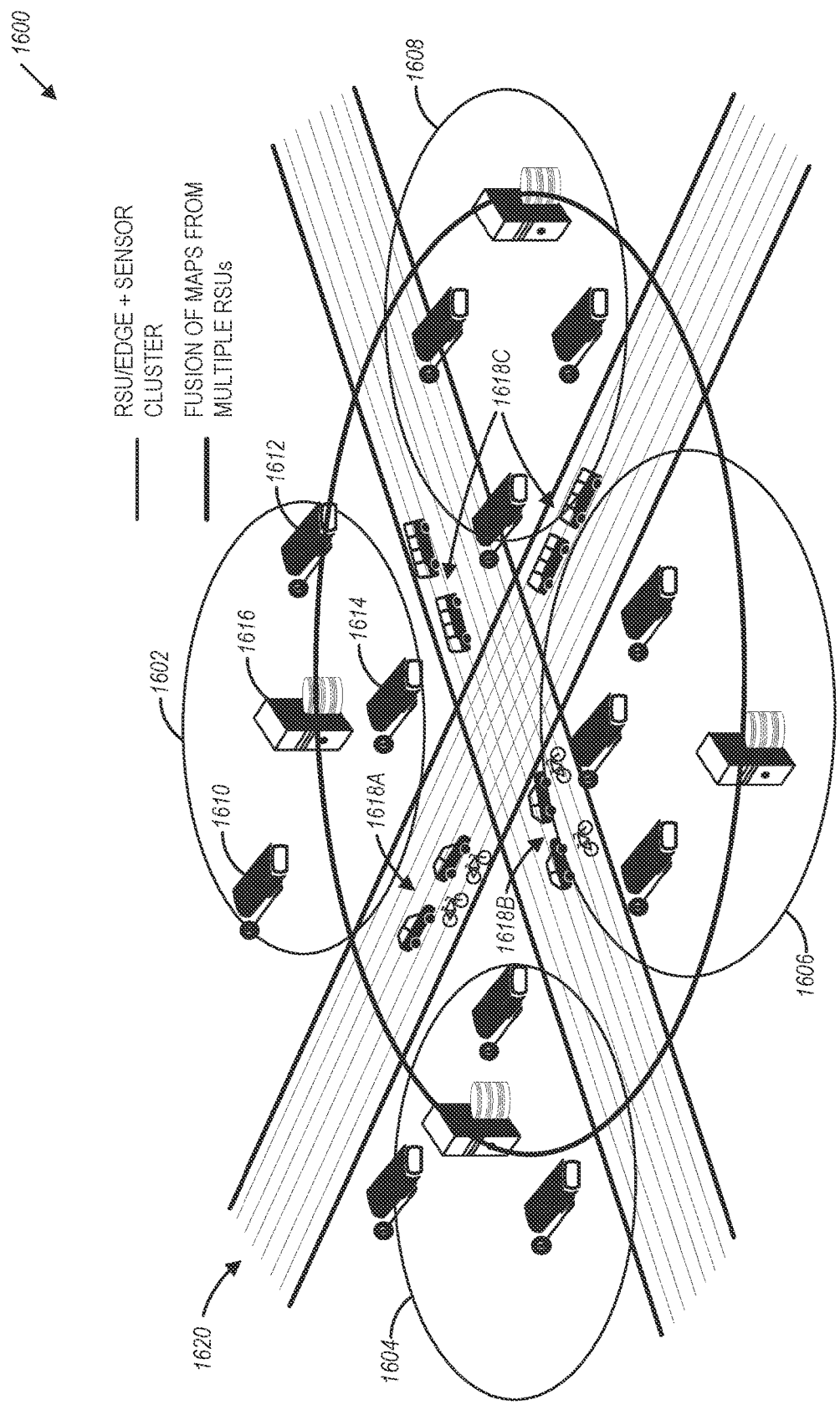
FIG. 16 illustrates an example occupancy grid map overlaid on a hierarchical sensor—RSU architecture, according to an example embodiment.

FIG. 16 illustrates an example occupancy grid map overlaid on a hierarchical sensor—RSU architecture 1600, according to an example embodiment. Referring to FIG. 16, architecture 1600 may be associated with a road infrastructure and may include device clusters 1602, 1604, 1606, and 1608 as well as additional road users 1618A, 1618B, and 16180 (e.g., traffic participants such as moving vehicles and cyclists). Device clusters 1602 may include multiple sensors (e.g., cameras) 1610, 1612, and 1614, as well as an RSU (or an edge node) 1616. The remaining device clusters 1604-1608 may include a similar combination of sensors and RSUs.

In some embodiments, the hierarchical architecture in FIG. 16 enables the matching of available edge compute capacity and network bandwidth to the relevant sensors and users. The selection of sensors to be associated with a given RSU or edge node can be time-varying or fixed (for example, moving vehicular sensors may associate with different RSUs in a time-varvinu manner depending on the location of the vehicle, load on the servers, etc.). Thus, the combination of sensors associated with a particular RSU or edge server that provide the best OGM will be made considering obstructions, overlapping fields of view, proximity to the geographical locations, wireless network congestion, traffic density, etc. to optimize the KPIs (e.g., accuracy, completeness, and timeliness of the service provided such as OGM for automatic navigation, safety, traffic efficiency, etc.).

Function (2): Dynamic Optimal Compute Allocation Between Sensors/Cameras and RSUs/Edge Nodes For each sensor/camera and RSU link, the computation distribution can be further adapted as shown in FIG. 17.

Figure 17:
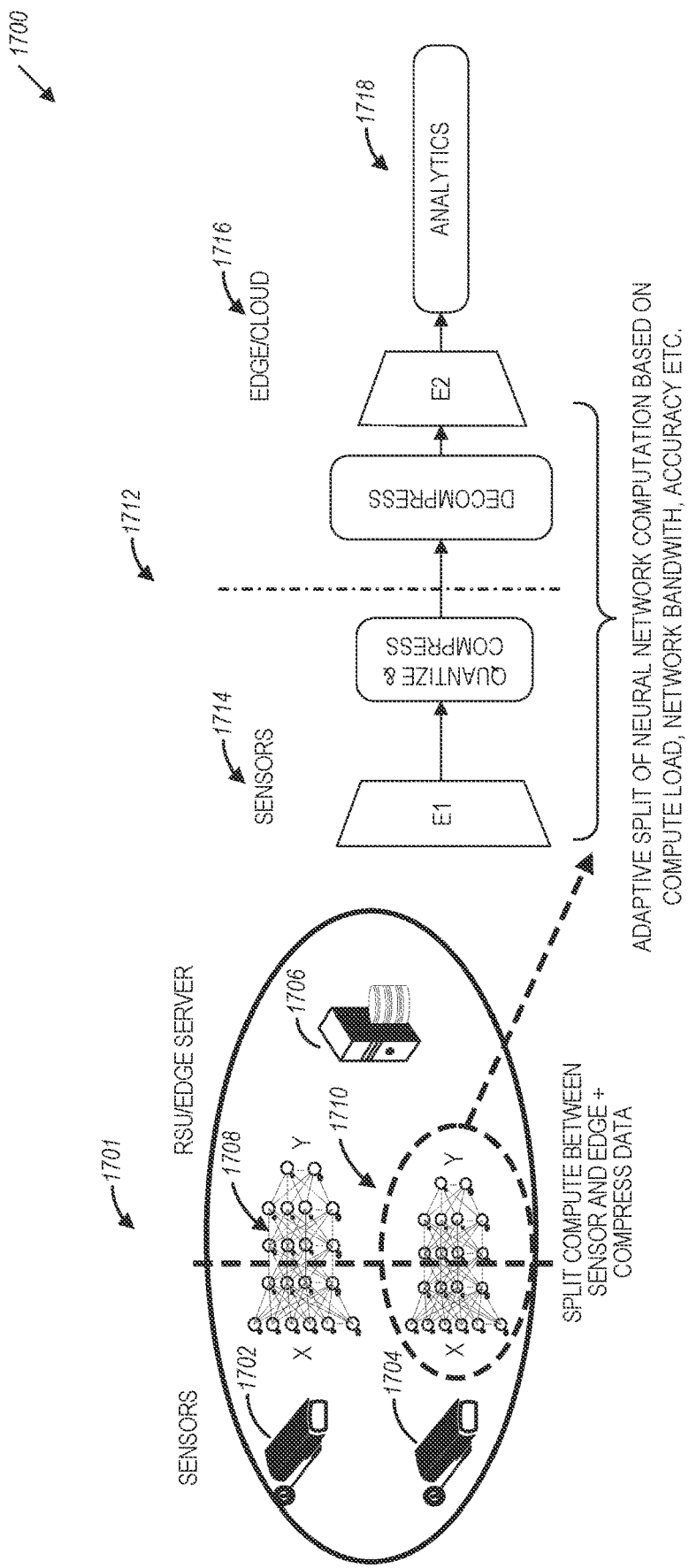
FIG. 17 illustrates a partition of a deep convolutional neural network (CNN) compute by splitting layers between sensors and RSU/edge server, according to an example embodiment.

FIG. 17 illustrates a diagram 1700 of a partition of a deep convolutional neural network (CNN) compute by splitting layers between sensors and RSU/edge server, according to an example embodiment. Referring to FIG. 17, diagram 1700 includes a device cluster 1701 formed with sensors 1702 and 1704 as well as RSUs 1706. In some aspects, sensors 1702 and 1704 generate corresponding sensor data 1708 and 1710, the processing of which may be split between the sensors and the RSU 1706. More specifically, the disclosed techniques may include using an adaptive split of a neural network architecture 1712 based on compute load, network bandwidth, accuracy, etc., the neural network architecture 1712 may be split so that processing of the sensor data using neural network layers 1714 is performed by the sensors to generate quantized and compressed data. The quantized and compressed data is then processed by the RSU 1706 using neural network layers 1716 (e.g., decompress the data and perform additional analytics processing 1718 to generate OGM data, such as OGM 1620 in FIG. 16).

In some aspects, the split in the neural network architecture 1712 is performed either statically (e.g., based upon device capabilities), or dynamically (e.g., as a function of vehicular traffic sensor density, network bandwidth, server load, etc.). The main feature of the computation is a deep CNN-based architecture (e.g., 1712) which computes that sensor's estimate of the OGM based upon its field of view, etc. However, the deep CNN is a computationally heavy task, while the sensor may have limited compute and the edge server may also be resource-constrained since it has to process multiple sensors simultaneously. Therefore, in some embodiments, a split of the neural network layers may be performed (e.g., as illustrated in FIG. 17) to enable some of the computation to be performed at the sensor (e.g., using neural network layers 1714), and the partially processed data is then transmitted to the RSU or the edge server where the remainder of the CNN processing takes place (e.g., using neural network layers 1716). To adapt the volume of data to the available network bandwidth, the neural network features in the shape of tensors can be quantized and compressed (which allows for accuracy and bandwidth/latency tradeoffs).

In some aspects, finding the optimal balance of compute/ analytics between cameras and the RSU or the edge node can reduce the overall latency and improve the accuracy. In this regard, the initial heavy computational processing can be done in parallel by many nodes instead of one node, and the resulting information (e.g., quantized and compressed sensor data) is transmitted over wireless channels resulting in a reduction of the communication latency.

Function (3): Deep CNN-Based Fusion Technique to Form a High-Quality OGM

In some embodiments, the output of the edge processing for a given sensor may include an OGM estimate based upon that sensor's FoV, network link quality, computational resource availability, etc. Furthermore, each RSU or edge server along with the associated sensors may generate an individual OGM which has some overlap with the maps produced by other nearby RSU or edge nodes and sensor clusters. In some embodiments, the OGM computation pipeline for each sensor may produce a soft output instead of a binary output OGM that is already in the form of a "hard" output such as occupied/unoccupied/unknown) and allow the RSU or edge node to do combined processing using the soft outputs. The processing of the soil outputs to produce a composite OGM can improve accuracy as well as latency.

In some embodiments, the deep CNNs may be trained to predict soft occupancy probabilities that form the OGM. In some aspects, Bayesian fusion techniques may be used to combine information from multiple camera sensors and multiple RSU or edge servers and form a single high-quality OGM.

In some aspects, the deep CNN can be trained offline using supervised learning, based upon a training dataset that includes ground truth occupancies (unsupervised, online learning techniques may also be developed). In some aspects, the training loss function may be represented as follows: $\mathcal{L}_{total} = \mathcal{L}_{cross-entropy} + \lambda \mathcal{L}_{uncertainty}$, where the cross-entropy loss term $\mathcal{L}_{cross-entropy}$ encourages the predicted OGM probability outputs (contained in the logits of the output layer) to match the ground truth occupancies. However, deep CNNs may learn to predict high confidence even in scenarios where their output is uncertain. Thus, the OGM output classified as occupied/unoccupied/unknown will largely contain the first two classes in the output, and not well reflect the uncertainly that a given sensor may experience due to several factors such as obstructed field of view, the accuracy of computation, etc.

In some aspects, to encourage the network to reflect this uncertainty, a second loss term $\mathcal{L}_{uncertainty}$ may be included in the overall loss and may be defined as follows: $\mathcal{L}_{uncertainty} = 1 - p(m_i^c|z_t)\log_2(p(m_i^c|z_t))$, where $p(m_i^c|z_t)$ is the estimated probability of occupancy that is here computed as the output of the deep CNN trained to predict these probabilities from a training set of images and associated ground truth occupancies. This term maximizes the entropy of the predictions, encouraging them to fall close to 0.5.

In some embodiments, a Bayesian filtering approach may be used to optimally combine information from multiple observations across multiple sensors, conveniently in the form of log-odds representation which is the deep CNN's pre-sigmoidal nonlinearity output activations, as follows:

$$l_{i,t}^c = \log \frac{p(m_i^c|z_t)}{1 - p(m_i^c|z_t)}.$$

These log-odds occupancy outputs from the various sensors over multiple observation intervals are then combined and the occupancy probability is recovered by a standard sigmoid function. The combined log-odds occupancies at an edge server or RSU may be represented as $l_{i,1:t}^c = \Sigma_{u=1}^t l_{i,u}^c$, where u represents either observation from multiple sensors or multiple time steps. From this equation, the combined occupancy can be recovered by undoing the log-odds calculation via the standard sigmoid nonlinearity function such as $$p(m_i^c|z_{1:t}) = \frac{1}{1 + \exp(-l_{i,1:t}^c)}.$$

Figure 18:
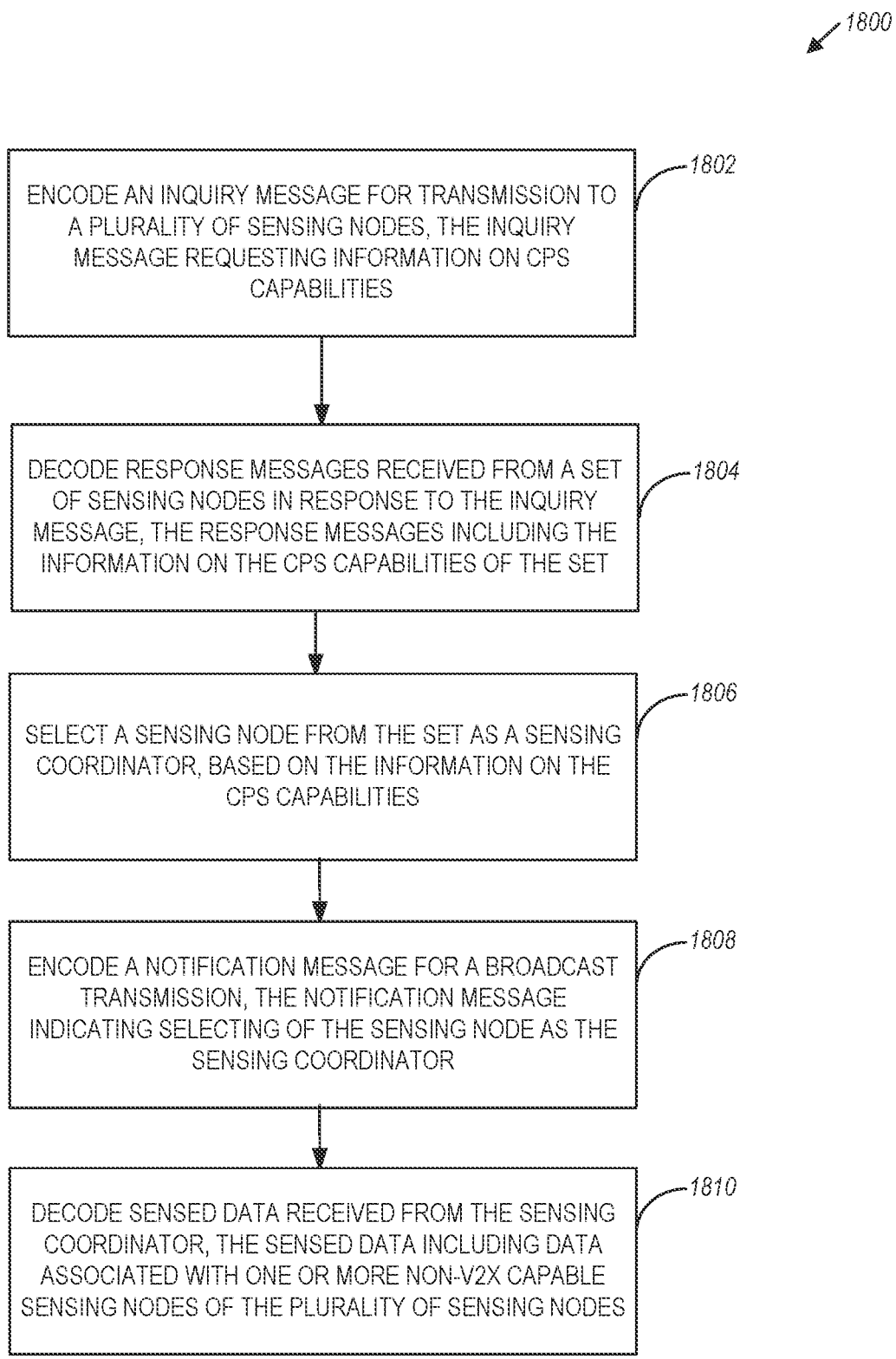
FIG. 18 is a flowchart illustrating a method for processing sensed data in a CP-based network, according to an example embodiment.

FIG. 18 is a flowchart illustrating a method 1800 for processing sensed data in a CP-based network, according to an example embodiment. Method 1800 includes operations 1802, 1804, 1806, 1808, and 1810, which can be performed by, e.g., one or more circuits within the data processing platform 102 or processing circuitry (e.g., processor 1902) of device 1900 of FIG. 19, in some aspects, the functions of FIG. 18 may be performed by a management entity described in connection with FIGS. 4-10.

At operation 1802, an inquiry message is encoded for transmission via interface circuitry to a plurality of sensing nodes in a CP-based network, the inquiry message requesting information on Collective Perception Service (CPS) capabilities. For example and about FIG. 4, the management entity 402 encodes an inquiry message (e.g., request message 410) for transmission to a plurality of sensing nodes (e.g., NRUs 404-408) in the CP-based network, where the inquiry message requesting information on CP capabilities and available sensor components.

At operation 1804, response messages received via the interface circuitry from a set of sensing nodes of the plurality of sensing nodes in response to the inquiry message are decoded. For example and about FIG. 4, the management entity 402 decodes response messages 412, . . . , 416 received from a set of sensing nodes (e.g., NRUs 404, . . . , 408), where the response messages include the information on the CPS capabilities of the sensing nodes.

At operation 1806, a sensing node is selected from the set of sensing nodes as a sensing coordinator in the CP-based network, based on the information on the CPS capabilities. For example and about FIG. 6, the management entity 602 selects the sensing coordinator at operation 610.

At operation 1808, a notification message is encoded for a broadcast transmission in the CP-based network via the interface circuitry, the notification message indicating selecting of the sensing node as the sensing coordinator. For example and about FIG. 6, when operation 614 includes an acknowledgment (ACK), the management entity 602 (at operation 616) may communicate a notification message for transmission (e.g., for broadcast or multicast transmission) to the NRUs 604-608 to indicate the selection of the sensing node.

At operation 1810, sensed data received in a broadcast message from the sensing coordinator is decoded. The sensed data may include data associated with one or more non-vehicle-to-everything (non-V2X) capable sensing nodes of the plurality of sensing nodes. For example and about FIG. 10, the management entity 1002 may function as the sensing coordinator and may broadcast/multicast (e.g., at operation 1018) aggregated sensed data.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include machine-readable media including read-only memory (ROM), random-access memory (RAM), magnetic disk storage media, optical storage media, flash-memory devices, and other storage devices and media.

A processor subsystem may be used to execute the instruction on the machine-readable media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field-programmable gate array (FPGA), or a fixed-function processor.

Examples, as described herein, may include, or may operate on, logic or a number of components, modules, or mechanisms. Modules may be hardware, software, or firmware communicatively coupled to one or more processors to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. The software may accordingly configure a hardware processor, for example, to constitute a particular module at one instance of time and to constitute a different module at a different instance of time. Modules may also be software or firmware modules, which operate to perform the methodologies described Herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system-on-chip (SoC), desktop computers, laptop computers, tablet computers, servers, smartphones, etc.

As used in any embodiment herein, the term "logic" may refer to firmware and/or circuitry configured to perform any of the aforementioned operations. Firmware may be embodied as code, instructions, or instruction sets and/or data that are hard-coded (e.g., nonvolatile) in memory devices and/or circuitry.

Figure 19:
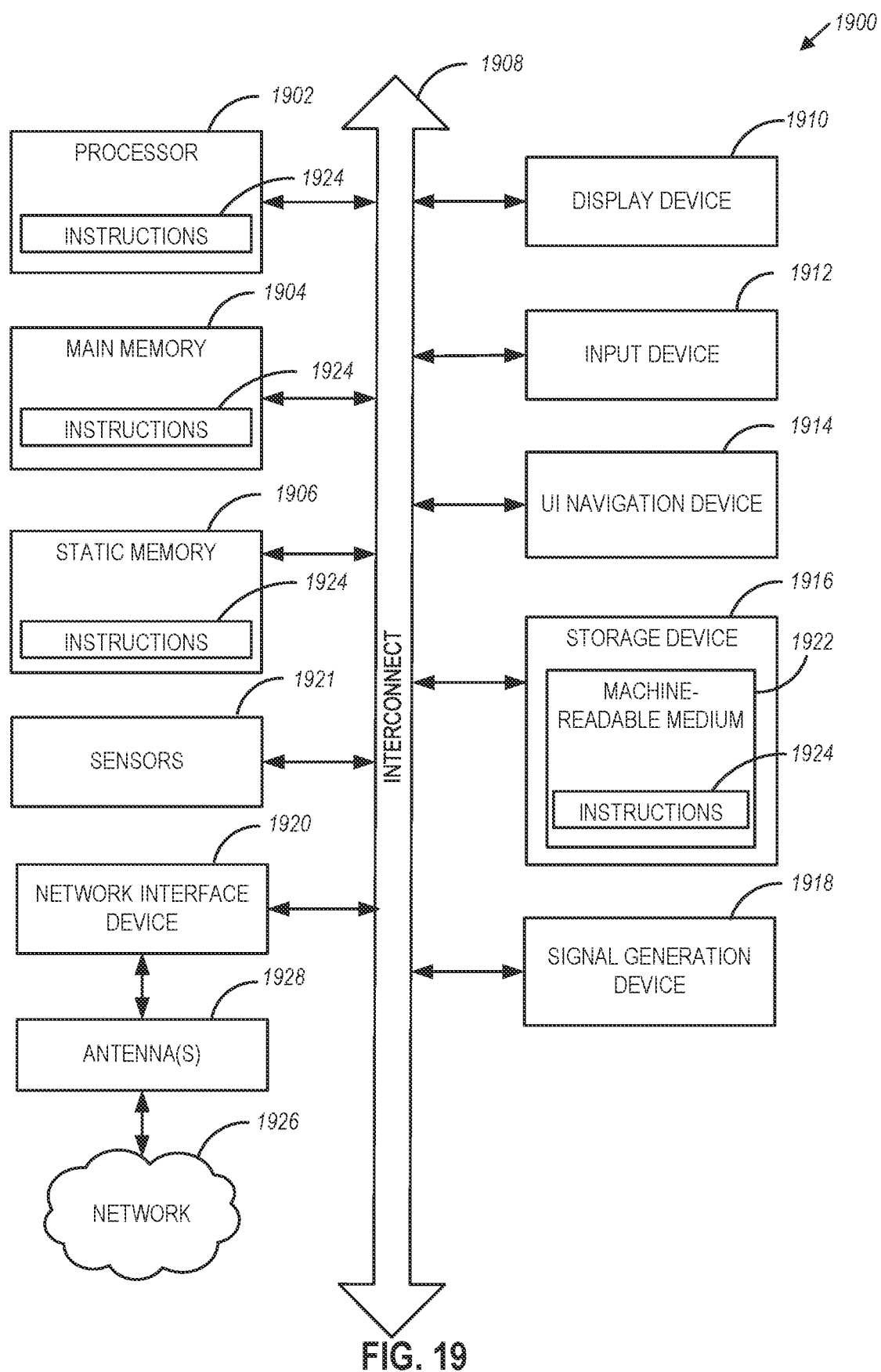
FIG. 19 is a block diagram illustrating an example machine upon which any one or more of the techniques (e.g., methodologies) discussed herein may perform, according to an example embodiment.

"Circuitry," as used in any embodiment herein, may comprise, for example, singly or in any combination, hardwired circuitry, programmable circuitry, state machine circuitry, logic, and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 19 is a block diagram illustrating a machine in the example form of a computer system 1900, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

The example computer system 1900 includes at least one processor 1902 (e.g., a central processing unit (CPU), a graphics processing unit (GPU) or both, processor cores, compute nodes, etc.), a main memory 1904, and a static memory 1906, which communicate with each other via a link 1908 (e.g., bus). The computer system 1900 may further include a video display unit 1910, an alphanumeric input device 1912 (e.g., a keyboard), and a user interface (UI) navigation device 1914 (e.g., a mouse). In one embodiment, the video display unit 1910, input device 1912, and UI navigation device 1914 are incorporated into a touch screen display. The computer system 1900 may additionally include a storage device 1916 (e.g., a drive unit), a signal generation device 1918 (e.g., a speaker), a network interface device 1920, and one or more sensors 1921, such as a global positioning system (GPS) sensor, compass, accelerometer, gyro meter, magnetometer, or other sensors. In some aspects, processor 1902 can include a main processor and a deep learning processor (e.g., used for performing deep learning functions including the neural network processing discussed hereinabove).

The storage device 1916 includes a machine-readable medium 1922 on which is stored one or more sets of data structures and instructions 1924 (e.g., software) embodying or utilized by any one or more of the methodologies or functions described herein. The instructions 1924 may also reside, completely or at least partially, within the main memory 1904, static memory 1906, and/or within the processor 1902 during execution thereof by the computer system 1900, with the main memory 1904, static memory 1906, and the processor 1902 also constituting machine-readable media.

While the machine-readable medium 1922 is illustrated in an example embodiment to be a single medium, the term "machine-readable medium" may include a single medium or multiple media (e.g., a centralized or distributed database, and/or associated caches and servers) that store the one or more instructions 1924. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1924 may further be transmitted or received over a communications network 1926 using a transmission medium (e.g., one or more antennas 1928) via the network interface device 1920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible media to facilitate communication of such software.

Described implementations of the subject matter can include one or more features, alone or in combination as illustrated below by way of examples.

Example 1 is a computing node to implement a management entity in a Collective Perception (CP)-based network, the node comprising: interface circuitry; and processing circuitry coupled to the interface circuitry, the processing circuitry configured to: encode an inquiry message for transmission via the interface circuitry to a plurality of sensing nodes in the CP-based network, the inquiry message requesting information on Collective Perception Service (CPS) capabilities; decode response messages received via the interface circuitry from a set of sensing nodes of the plurality of sensing nodes in response to the inquiry message, the response messages including the information on the CPS capabilities of the set of sensing nodes; select a sensing node from the set of sensing nodes as a sensing coordinator in the CP-based network, based on the information on the CPS capabilities; encode a notification message for a broadcast transmission in the CP-based network via the interface circuitry, the notification message indicating selecting of the sensing node as the sensing coordinator; and decode sensed data received in a broadcast message from the sensing coordinator, the sensed data including data associated with one or more non-vehicle-to-everything (non-V2X) capable sensing nodes of the plurality of sensing nodes.

In Example 2, the subject matter of Example 1 includes subject matter where the processing circuitry is configured to: encode the inquiry message for transmission via the interface circuitry as a cellular V2X (C-V2X) message, and wherein the inquiry message further requests information on sensor capabilities.

In Example 3, the subject matter of Example 2 includes subject matter where the processing circuitry is configured to select the sensing node from the set of sensing nodes as the sensing coordinator further based on the information on the sensor capabilities of the sensing node received in the response message.

In Example 4, the subject matter of Example 3 includes subject matter where the information on the sensor capabilities of the sensing node includes one or more of: information related to available sensors; information on sensor model for each of the available sensors; and information on sensor manufacturer for each of the available sensors.

In Example 5, the subject matter of Examples 1-4 includes subject matter where to select the sensing node, the processing circuitry is configured to encode a second inquiry message for a broadcast transmission via the interface circuitry as a cellular V2X (C-V2X) message in the CP-based network, the second inquiry message inquiring whether the sensing node is available to serve as the sensing coordinator.

In Example 6, the subject matter of Example 5 includes subject matter where to select the sensing node, the processing circuitry is configured to: select the sensing node as the sensing coordinator based on an acknowledgment message received from the sensing node via the interface circuitry in response to the second inquiry message.

In Example 7, the subject matter of Examples 5-6 includes subject matter where the processing circuitry is configured to select another sensing node from the set of sensing nodes as the sensing coordinator in the CP-based network based on a non-acknowledgment message received from the sensing node via the interface circuitry, the cion-acknowledgment message received in response to the second inquity message.

In Example 8, the subject matter of Examples 1-7 includes subject matter where the plurality of sensing nodes comprises: at least one computing device that is moving within a road infrastructure associated with the CP-based network; or at least one computing device that is stationary within the road infrastructure.

In Example 9, the subject matter of Example 8 includes subject matter where the at least one computing device that is moving is associated with a pedestrian, a motorcycle, a bike, or a vehicle moving within the road infrastructure, and wherein the at least one computing device that is stationary is a roadside unit (RSU).

In Example 10, the subject matter of Examples 1-9 includes subject matter where the sensed data comprises data generated by one or more sensors of the sensing coordinator and processed at the sensing coordinator, by a first portion of neural network layers of a convolutional neural network (CNN).

In Example 11, the subject matter of Example 10 includes subject matter Where the processing circuitry is configured to apply a second, remaining portion of neural network layers of the CNN to the sensed data to generate an estimate of an occupancy grid map (OGM) associated with the CP-based network.

In Example 12, the subject matter of Examples 1-11 includes subject matter where the processing circuitry is implemented in a first vehicle and the sensing coordinator is a second vehicle, the first and second vehicles moving within a road infrastructure of the CP-based network, and wherein the processing circuitry is configured to decode the sensed data to obtain a keep-out zone, the keep-out zone representing a non-drivable area of the road infrastructure that is sensed by the second vehicle; and determine a drivable area of the road infrastructure for use by the first vehicle, based on the keep-out zone.

Example 13 is at least one non-transitory machine-readable storage medium comprising instructions stored thereupon, which when executed by processing circuitry of a computing node operable in a Collective Perception (CP)-based network, cause the processing circuitry to perform operations comprising: encoding an inquiry message fir transmission via interface circuitry to a plurality of sensing nodes in the CP-based network, the inquiry message requesting information on Collective Perception Service (CPS) capabilities; decoding response messages received via the interface circuitry from a set of sensing nodes of the plurality of sensing nodes in response to the inquiry message, the response messages including the information on the CPS capabilities of the set of sensing nodes; selecting a sensing node from the set of sensing nodes as a sensing coordinator in the CP-based network, based on the information on the CPS capabilities; encoding a notification message for a broadcast transmission in the CP-based network via the interface circuitry, the notification message indicating the selecting of the sensing node as the sensing coordinator; and decoding sensed data received in a broadcast message from the sensing coordinator, the sensed data including data associated with one or more non-vehicle-to-everything (non-V2X) capable sensing nodes of the plurality of sensing nodes.

In Example 14, the subject matter of Example 13 includes, the operations further comprising: encoding the inquiry message for transmission via the interface circuitry as a cellular V2X (C-V2X) message, and wherein the inquiry message further requests information on sensor capabilities.

In Example 15, the subject matter of Example 14 includes, the operations further comprising: selecting the sensing node from the set of sensing nodes as the sensing coordinator further based on the information on the sensor capabilities of the sensing node received in the response message.

In Example 16, the subject matter of Examples 13-15 includes, the operations further comprising: encoding a second inquiry message for a broadcast transmission via the interface circuitry as a cellular V2X (C-V2X) message in the CP-based network, the second inquiry message inquiring whether the sensing node is available to serve as the sensing coordinator.

In Example 17, the subject matter of Example 16 includes, the operations further comprising: selecting the sensing node as the sensing coordinator based on an acknowledgment message received from the sensing node via the interface circuitry in response to the second inquiry message.

In Example 18, the subject matter of Examples 16-17 includes, the operations further comprising: selecting another sensing node from the set of sensing nodes as the sensing coordinator in the CP-based network based on a non-acknowledgment message, the non-acknowledgment message received from the sensing node via the interface circuitry in response to the second inquiry message.

In Example 19, the subject matter of Examples 13-18 includes subject matter where the plurality of sensing nodes comprises at least one computing device that is moving within a road infrastructure associated with the CP-based network or at least one computing device that is stationary within the road infrastructure; wherein the at least one computing device that is moving is associated with a pedestrian, a motorcycle, a bike, or a vehicle moving within the road infrastructure; and wherein the at least one computing device that is stationary is a roadside unit (RSU).

In Example 20, the subject matter of Examples 13-19 includes subject matter where the sensed data comprises data generated by one or more sensors of the sensing coordinator and processed at the sensing coordinator, by a first portion of neural network layers of a convolutional neural network (CNN).

In Example 21, the subject matter of Example 20 includes, the operations further comprising: applying a second, remaining portion of neural network layers of the CNN to the sensed data to generate an estimate of an occupancy grid map (OGM) associated with the CP-based network.

In Example 22, the subject matter of Examples 13-21 includes subject matter where the processing circuitry is implemented in a first vehicle and the sensing coordinator is a second vehicle, the first and second vehicles moving within a road infrastructure of the CP-based network, and wherein the operations further comprising: decoding the sensed data to obtain a keep-out zone, the keep-out zone representing a non-drivable area of the road infrastructure that is sensed by the second vehicle; and determining a drivable area of the road infrastructure for use by the first vehicle, based on the keep-out zone.

Example 23 is a computing node to implement a management entity, comprising: means for encoding an inquiry message for transmission to a plurality of sensing nodes, the inquiry message requesting information on Collective Perception Service (CPS) capabilities; means for decoding response messages received from a set of sensing nodes of the plurality of sensing nodes in response to the inquiry message, the response messages including the information on the CPS; means for selecting a sensing node from the set of sensing nodes as a sensing coordinator, based on the information on the CPS capabilities; means for encoding a notification message for broadcast transmission, the notification message indicating the selecting of the sensing node as the sensing coordinator; and means for decoding sensed data received in a broadcast message from the sensing coordinator, the sensed data including data associated with non-vehicle-to-everything (non-V2X) capable sensing nodes of the plurality of sensing nodes.

In Example 24, the subject matter of Example 23 includes subject matter where the sensed data comprises data generated by one or more sensors of the sensing coordinator and processed at the sensing coordinator, by a first portion of neural network layers of a convolutional neural network (CNN), and wherein the computing node further comprises: means for applying a second, remaining portion of neural network layers of the CNN to the sensed data to generate an estimate of an occupancy grid map (OGM).

In Example 25, the subject matter of Examples 23-24 includes subject matter where the management entity is a first vehicle and the sensing coordinator is a second vehicle, the first and second vehicles moving within a road infrastructure, and wherein the computing node further comprises means for decoding the sensed data to obtain a keep-out zone, the keep-out zone representing a non-drivable area of the road infrastructure that is sensed by the second vehicle; and means for determining a drivable area of the road infrastructure for use by the first vehicle, based on the keep-out zone.

Example 26 is an edge computing system, comprising a plurality of edge computing nodes, the plurality of edge computing nodes configured with the biometric security methods of any of the examples of 1-25.

Example 27 is an edge computing node, operable in an edge computing system, comprising processing circuitry configured to implement any of the examples of 1-25.

Example 28 is an edge computing node, operable as a server in an edge computing system, configured to perform any of the examples of 1-25.

Example 29 is an edge computing node, operable as a client in an edge computing system, configured to perform any of the examples of 1-25.

Example 30 is an edge computing node, operable in a layer of an edge computing network as an aggregation node, network hub node, gateway node, or core data processing node, configured to perform any of the examples of 1-25.

Example 31 is an edge computing network, comprising networking and processing components configured to provide or operate a communications network, to enable an edge computing system to implement any of the examples of 1-25.

Example 32 is an access point, comprising networking and processing components configured to provide or operate a communications network, to enable an edge computing system to implement any of the examples of 1-25.

Example 33 is a base station, comprising networking and processing components configured to provide or operate a communications network, to enable an edge computing system to implement any of the examples of 1-25.

Example 34 is a roadside unit, comprising networking components configured to provide or operate a communications network, to enable an edge computing system to implement any of the examples of 1-25.

Example 35 is an on-premise server, operable in a private communications network distinct from a public edge computing network, the server configured to enable an edge computing system to implement any of the examples of 1-25.

Example 36 is a 3GPP 4G/LTE mobile wireless communications system, comprising networking and processing components configured with the biometric security methods of any of the examples of 1-25.

Example 37 is a 5G network mobile wireless communications system, comprising networking and processing components configured with the biometric security methods of any of the examples of 1-25.

Example 38 is a user equipment device, comprising networking and processing circuitry, configured to connect with an edge computing system configured to implement any of the examples of 1-25.

Example 39 is a client computing device, comprising processing circuitry, configured to coordinate compute operations with an edge computing system, where the edge computing system is configured to implement any of the examples of 1-25.

Example 40 is an edge provisioning node, operable in an edge computing system, configured to implement any of the examples of 1-25.

Example 41 is a service orchestration node, operable in an edge computing system, configured to implement any of the examples of 1-25.

Example 42 is an application orchestration node, operable in an edge computing system, configured to implement any of the examples of 1-25.

Example 43 is a multi-tenant management node, operable in an edge computing system, configured to implement any of the examples of 1-25.

Example 44 is an edge computing system comprising processing circuitry, the edge computing system configured to operate one or more functions and services to implement any of the examples of 1-25.

Example 45 is networking hardware with network functions implemented thereupon, operable within an edge computing system configured with the biometric security methods of any of the examples of 1-25.

Example 46 is acceleration hardware with acceleration functions implemented thereupon, operable in an edge computing system, the acceleration functions configured to implement any of the examples of 1-25.

Example 47 is storage hardware with storage capabilities implemented thereupon, operable in an edge computing system, the storage hardware configured to implement any of the examples of 1-25.

Example 48 is computation hardware with compute capabilities implemented thereupon, operable in an edge computing system, the computation hardware configured to implement any of the examples of 1-25.

Example 49 is an edge computing system adapted for supporting vehicle-to-vehicle (V2V), vehicle-to-everything (V2X), or vehicle-to-infrastructure (V2I) scenarios, configured to implement any of the examples of 1-25.

Example 50 is an edge computing system adapted for operating according to one or more European Telecommunications Standards Institute (ETSI) Multi-Access Edge Computing (MEC) specifications, the edge computing system configured to implement any of the examples of 1-25.

Example 51 is an edge computing system adapted for operating one or more multi-access edge computing (MEC) components, the MEC components provided from one or more of: a MEC proxy, a MEC application orchestrator, a MEC application, a MEC platform, or a MEC service, according to a European Telecommunications Standards Institute (ETSI) Multi-Access Edge Computing (MEC) configuration, the MEC components configured to implement any of the examples of 1-25.

Example 52 is an edge computing system configured as an edge mesh, provided with a microservice cluster, a microservice cluster with sidecars, or linked microservice clusters with sidecars, configured to implement any of the examples of 1-25.

Example 53 is an edge computing system, comprising circuitry configured to implement one or more isolation environments provided among dedicated hardware, virtual machines, containers, virtual machines on containers, configured to implement any of the examples of 1-25.

Example 54 is an edge computing server, configured for operation as an enterprise server, roadside server, street cabinet server, or telecommunications server, configured to implement any of the examples of 1-25.

Example 55 is an edge computing system configured to implement any of the examples of 1-25 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 56 is an edge computing system, comprising computing nodes operated by multiple owners at different geographic locations, configured to implement any of the examples of 1-25.

Example 57 is a cloud computing system, comprising data servers operating respective cloud services, the respective cloud services configured to coordinate with an edge computing system to implement any of the examples of 1-25.

Example 58 is a server, comprising hardware to operate cloudlet, edgelet, or applet services, the services configured to coordinate with an edge computing system to implement any of the examples of 1-25.

Example 59 is an edge node in an edge computing system, comprising one or more devices with at least one processor and memory to implement any of the examples of 1-25.

Example 60 is an edge node in an edge computing system, the edge node operating one or more services provided from among a management console service, a telemetry service, a provisioning service, an application or service orchestration service, a virtual machine service, a container service, a function deployment service, or a compute deployment service, or an acceleration management service, the one or more services configured to implement any of the examples of 1-25.

Example 61 is a set of distributed edge nodes, distributed among a network layer of an edge computing system, the network layer comprising a close edge, local edge, enterprise edge, on-premise edge, near edge, middle, edge, or far edge network layer, configured to implement any of the examples of 1-25.

Example 62 is an apparatus of an edge computing system comprising: one or more processors and one or more computer-readable media comprising instructions that, when executed by the one or more processors, cause the one or more processors to perform any of the examples of 1-25.

Example 63 is one or more computer-readable storage media comprising instructions to cause an electronic device of an edge computing system, upon execution of the instructions by one or more processors of the electronic device, to perform any of the examples of 1-25.

Example 64 is a communication signal communicated in an edge computing system, to perform any of the examples of 1-25.

Example 65 is a data structure communicated in an edge computing system, the data structure comprising a datagram, packet, frame, segment, protocol data unit (PDU), or message, to perform any of the examples of 1-25.

Example 66 is a signal communicated in an edge computing system, the signal encoded with a datagram, packet, frame, segment, protocol data unit (PDU), message, or data to perform any of the examples of 1-25.

Example 67 is an electromagnetic signal communicated in an edge computing system, the electromagnetic signal carrying computer-readable instructions, wherein execution of the computer-readable instructions by one or more processors causes the one or more processors to perform any of the examples of 1-25.

Example 68 is a computer program used in an edge computing system, the computer program comprising instructions, wherein execution of the program by a processing element in the edge computing system is to cause the processing element to perform any of the examples of 1-25.

Example 69 is an apparatus of an edge computing system comprising means to perform any of the examples of 1-25.

Example 70 is an apparatus of an edge computing system comprising logic, modules, or circuitry to perform any of the examples of 1-25.

Example 71 is an apparatus of an edge computing system comprising logic, modules, or circuitry which may be implemented in a vehicle or another node. Among a group of vehicles (typically in the coverage range of a direct link vehicular communication system, such as C-V2X or ITS-G5 or DSRC operating in 5.9 GHz for example), the apparatus is receiving the information to be assigned to perform Collective Perception (CP) tasks (alternatively it is identifying itself to be a vehicle conducting Collective Perception tasks) from one or multiple neighboring vehicles or one or multiple infrastructure communication entities. In some embodiments, the designated apparatus (e.g., vehicle) is obtaining information through sensing those neighboring vehicles which are identified not to apply any vehicular communication (or a system different from the system used by the designated vehicle). In some embodiments, the sensing of neighboring vehicles is performed through onboard sensors which may include video, Lidar, Radar, etc. sensors.

Example 72 is at least one machine-readable medium including instructions that, when executed by processing circuitry, cause the processing circuitry to perform operations to implement any of Examples 1-71.

Example 73 is an apparatus comprising means to implement any of Examples 1-71.

Example 74 is a system to implement any of Examples 1-71.

Example 75 is a method to implement any of Examples 1-71.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled,

What is claimed is:

1. A computing node to implement a management entity in a Collective Perception (CP)-based network, the node comprising:
    interface circuitry; and
    processing circuitry coupled to the interface circuitry, the processing circuitry configured to:
        encode an inquiry message for transmission via the interface circuitry to a plurality of sensing nodes in the CP-based network, the inquiry message requesting information on Collective Perception Service (CPS) capabilities;
        decode response messages received via the interface circuitry from a set of sensing nodes of the plurality of sensing nodes in response to the inquiry message, the response messages including the information on the CPS capabilities of the set of sensing nodes;
        select a sensing node from the set of sensing nodes as a sensing coordinator in the CP-based network, based on the information on the CPS capabilities;
        encode a notification message for a broadcast transmission in the CP-based network via the interface circuitry, the notification message indicating selecting of the sensing node as the sensing coordinator; and
        decode sensed data received in a broadcast message from the sensing coordinator, the sensed data including data associated with one or more non-vehicle-to-everything (non-V2X) capable sensing nodes of the plurality of sensing nodes.

2. The computing node of claim 1, wherein the processing circuitry is configured to:
    encode the inquiry message for transmission via the interface circuitry as a cellular V2X (C-V2X) message, and wherein the inquiry message further requests information on sensor capabilities.

3. The computing node of claim 2, wherein the processing circuitry is configured to:
    select the sensing node from the set of sensing nodes as the sensing coordinator further based on the information on the sensor capabilities of the sensing node received in the response message.

4. The computing node of claim 3, wherein the information on the sensor capabilities of the sensing node includes one or more of:
    information related to available sensors;
    information on sensor model for each of the available sensors; and
    information on sensor manufacturer for each of the available sensors.

5. The computing node of claim 1, wherein to select the sensing node, the processing circuitry is configured to:
    encode a second inquiry message for a broadcast transmission via the interface circuitry as a cellular V2X (C-V2X) message in the CP-based network, the second inquiry message inquiring whether the sensing node is available to serve as the sensing coordinator.

6. The computing node of claim 5, wherein to select the sensing node, the processing circuitry is configured to:
select the sensing node as the sensing coordinator based on an acknowledgment message received from the sensing node via the interface circuitry in response to the second inquiry message.

7. The computing node of claim 5, wherein the processing circuitry is configured to:
select another sensing node from the set of sensing nodes as the sensing coordinator in the CP-based network based on a non-acknowledgment message received from the sensing node via the interface circuitry, the non-acknowledgment message received in response to the second inquiry message.

8. The computing node of claim 1, wherein the plurality of sensing nodes comprises:
at least one computing device that is moving within a road infrastructure associated with the CP-based network; or
at least one computing device that is stationary within the road infrastructure.

9. The computing node of claim 8, wherein the at least one computing device that is moving is associated with a pedestrian, a motorcycle, a bike, or a vehicle moving within the road infrastructure, and wherein the at least one computing device that is stationary is a roadside unit (RSU).

10. The computing node of claim 1, wherein the sensed data comprises data generated by one or more sensors of the sensing coordinator and processed at the sensing coordinator, by a first portion of neural network layers of a convolutional neural network (CNN).

11. The computing node of claim 10, wherein the processing circuitry is configured to:
apply a second, remaining portion of neural network layers of the CNN to the sensed data to generate an estimate of an occupancy grid map (OGM) associated with the CP-based network.

12. The computing node of claim 1, wherein the processing circuitry is implemented in a first vehicle and the sensing coordinator is a second vehicle, the first and second vehicles moving within a road infrastructure of the CP-based network, and wherein the processing circuitry is configured to:
decode the sensed data to obtain a keep-out zone, the keep-out zone representing a non-drivable area of the road infrastructure that is sensed by the second vehicle; and
determine a drivable area of the road infrastructure for use by the first vehicle, based on the keep-out zone.

13. At least one non-transitory machine-readable storage medium comprising instructions stored thereupon, which when executed by processing circuitry of a computing node operable in a Collective Perception (CP)-based network, cause the processing circuitry to perform operations comprising:
encoding an inquiry message for transmission via interface circuitry to a plurality of sensing nodes in the CP-based network, the inquiry message requesting information on Collective Perception Service (CPS) capabilities;
decoding response messages received via the interface circuitry from a set of sensing nodes of the plurality of sensing nodes in response to the inquiry message, the response messages including the information on the CPS capabilities of the set of sensing nodes;
selecting a sensing node from the set of sensing nodes as a sensing coordinator in the CP-based network, based on the information on the CPS capabilities;
encoding a notification message for a broadcast transmission in the CP-based network via the interface circuitry, the notification message indicating the selecting of the sensing node as the sensing coordinator; and
decoding sensed data received in a broadcast message from the sensing coordinator, the sensed data including data associated with one or more non-vehicle-to-everything (non-V2X) capable sensing nodes of the plurality of sensing nodes.

14. The at least one non-transitory machine-readable storage medium of claim 13, the operations further comprising:
encoding the inquiry message for transmission via the interface circuitry as a cellular V2X (C-V2X) message, and wherein the inquiry message further requests information on sensor capabilities.

15. The at least one non-transitory machine-readable storage medium of claim 14, the operations further comprising:
selecting the sensing node from the set of sensing nodes as the sensing coordinator further based on the information on the sensor capabilities of the sensing node received in the response message.

16. The at least one non-transitory machine-readable storage medium of claim 13, the operations further comprising:
encoding a second inquiry message for a broadcast transmission via the interface circuitry as a cellular V2X (C-V2X) message in the CP-based network, the second inquiry message inquiring whether the sensing node is available to serve as the sensing coordinator.

17. The at least one non-transitory machine-readable storage medium of claim 16, the operations further comprising:
selecting the sensing node as the sensing coordinator based on an acknowledgment message received from the sensing node via the interface circuitry in response to the second inquiry message.

18. The at least one non-transitory machine-readable storage medium of claim 16, the operations further comprising:
selecting another sensing node from the set of sensing nodes as the sensing coordinator in the CP-based network based on a non-acknowledgment message, the non-acknowledgment message received from the sensing node via the interface circuitry in response to the second inquiry message.

19. The at least one non-transitory machine-readable storage medium of claim 13, wherein the plurality of sensing nodes comprises at least one computing device that is moving within a road infrastructure associated with the CP-based network or at least one computing device that is stationary within the road infrastructure;
wherein the at least one computing device that is moving is associated with a pedestrian, a motorcycle, a bike, or a vehicle moving within the road infrastructure; and
wherein the at least one computing device that is stationary is a roadside unit (RSU).

20. The at least one non-transitory machine-readable storage medium of claim 13, wherein the sensed data comprises data generated by one or more sensors of the sensing coordinator and processed at the sensing coordinator, by a first portion of neural network layers of a convolutional neural network (CNN).

21. The at least one non-transitory machine-readable storage medium of claim 20, the operations further comprising:
   applying a second, remaining portion of neural network layers of the CNN to the sensed data to generate an estimate of an occupancy grid map (OGM) associated with the CP-based network.

22. The at least one non-transitory machine-readable storage medium of claim 13, wherein the processing circuitry is implemented in a first vehicle and the sensing coordinator is a second vehicle, the first and second vehicles moving within a road infrastructure of the CP-based network, and wherein the operations further comprising:
   decoding the sensed data to obtain a keep-out zone, the keep-out zone representing a non-drivable area of the road infrastructure that is sensed by the second vehicle; and
   determining a drivable area of the road infrastructure for use by the first vehicle, based on the keep-out zone.

* * * * *